(12) United States Patent
Yuki et al.

(10) Patent No.: US 8,650,242 B2
(45) Date of Patent: Feb. 11, 2014

(54) DATA PROCESSING APPARATUS AND DATA PROCESSING METHOD

(75) Inventors: Yasuhiro Yuki, Osaka (JP); Kento Ogawa, Osaka (JP)

(73) Assignee: Panasonic Corporation, Osaka (JP)

( * ) Notice: Subject to any disclaimer, the term of this patent is extended or adjusted under 35 U.S.C. 154(b) by 119 days.

(21) Appl. No.: 13/320,383

(22) PCT Filed: Mar. 2, 2011

(86) PCT No.: PCT/JP2011/001211
§ 371 (c)(1),
(2), (4) Date: Nov. 14, 2011

(87) PCT Pub. No.: WO2011/114634
PCT Pub. Date: Sep. 22, 2011

(65) Prior Publication Data
US 2012/0066309 A1    Mar. 15, 2012

(30) Foreign Application Priority Data

Mar. 18, 2010    (JP) ................................. 2010-062420

(51) Int. Cl.
*G06F 15/16*    (2006.01)
(52) U.S. Cl.
USPC ........... 709/201; 709/204; 715/763; 715/765; 725/46; 725/105
(58) Field of Classification Search
USPC ........... 709/204, 201; 715/763, 765; 707/739, 707/748, 749; 725/46, 105
See application file for complete search history.

(56) References Cited

U.S. PATENT DOCUMENTS

| 2007/0239771 A1 | 10/2007 | Shimizu et al. | |
| 2009/0133071 A1 | 5/2009 | Sakai et al. | |
| 2009/0133081 A1 | 5/2009 | Sakai et al. | |
| 2009/0164624 A1* | 6/2009 | Metcalf et al. | 709/224 |
| 2011/0041072 A1* | 2/2011 | Jeon | 715/739 |
| 2011/0218997 A1* | 9/2011 | Boiman et al. | 707/737 |

FOREIGN PATENT DOCUMENTS

| JP | 2001-60200 | 3/2001 |
| JP | 2001-290789 | 10/2001 |
| JP | 3471605 | 12/2003 |
| JP | 2007-34743 | 2/2007 |
| JP | 2007-280125 | 10/2007 |
| JP | 2009-124606 | 6/2009 |
| JP | 2009-141952 | 6/2009 |
| JP | 2009-206774 | 9/2009 |

OTHER PUBLICATIONS

International Search Report issued Apr. 5, 2011 in International (PCT) Application No. PCT/JP2011/001211.

* cited by examiner

*Primary Examiner* — Frantz Jean
(74) *Attorney, Agent, or Firm* — Wenderoth, Lind & Ponack, L.L.P

(57) ABSTRACT

A data processing apparatus (100) for outputting content data, which includes: a data output determination unit (107) which determines whether or not to output the content data using social information including (i) closeness indicating a degree of familiarity between certain users and (ii) information for associating the content data with the closeness; and an application unit (104) which outputs the content data when the data output determination unit (107) determines to output the content data. The data output determination unit (107) refers to the social information and determines to output the content data associated with the closeness when the closeness is equal to or greater than a predetermined threshold.

14 Claims, 49 Drawing Sheets

| ID | Data Name | Extension | Type | Device ID | Date of Shooting | |
|----|-----------|-----------|-------|-----------|------------|-------|
| 1 | X-1 | jpg | Image | DSC-X | 2002/10/1 | 10:50 |
| 2 | X-2 | jpg | Image | DSC-X | 2002/10/3 | 14:03 |
| 3 | Y-1 | jpg | Image | DSC-Y | 2002/10/1 | 09:42 |
| 4 | Y-2 | jpg | Image | DSC-Y | 2002/10/1 | 11:37 |
| 5 | Z-1 | jpg | Image | DSC-Z | 2002/10/1 | 12:05 |
| 6 | Z-2 | jpg | Image | DSC-Z | 2002/10/2 | 10:50 |
| 7 | P-1 | jpg | Image | CM-P | 2002/10/1 | 12:12 |
| 8 | P-2 | jpg | Image | CM-P | 2002/10/1 | 13:43 |
| 9 | V-1 | jpg | Image | DSC-V | 2002/10/1 | 10:33 |
| 10 | V-2 | jpg | Image | DSC-V | 2002/10/1 | 12:22 |
| ... | ... | ... | ... | ... | ... | |

(b)

| Priority |
|----------|
| — |
| — |
| C |
| C |
| A |
| A |
| B |
| B |
| unknown |
| unknown |
| ... |

FIG. 3

| ID | Name | Address | Owned-Device ID | Closeness |
|---|---|---|---|---|
| 0 | Mike | mike@xxx.com | DSC-X | — |
| 1 | Alice | alice@aaa.com | DSC-Z | 0.83 |
| 2 | Julia | julia@jjj.com | TV-J | 0.83 |
| 3 | Tom | tom@ttt.com | DSC-T, HS-T | 0.53 |
| 4 | Paul | paul@ppp.com | CM-P | 0.51 |
| 5 | James | james@yyy.com | DSC-Y | 0.42 |
| 6 | Dan | dan@ddd.com | CM-D | 0.18 |
| 7 | Kevin | kevin@kkk.com | DSC-K | 0.06 |
| ... | ... | ... | ... | ... |

FIG. 8

| GID | Common Attribute | Common Element | Corresponding Data Name |
|---|---|---|---|
| G1 | Date of Shooting | 2002/10/1 | X-1, Y-1, Y-2, Z-1, P-1, P-2, V-1, V-2 |
| G2 | Date of Shooting | 2002/10/2 | Z-2 |
| G3 | Date of Shooting | 2002/10/3 | X-2 |
| ⋮ | ⋮ | ⋮ | ⋮ |

FIG. 10A

| ID | Data Name | Reference ID | Priority | Date of Shooting |
|---|---|---|---|---|
| S1 | X-1 | 1 | — | 2002/10/1 10:50 |
| S2 | Z-1 | 5 | A | 2002/10/1 12:05 |
| S3 | P-1 | 7 | B | 2002/10/1 12:12 |
| S4 | P-2 | 8 | B | 2002/10/1 13:43 |
| ... | ... | ... | ... | ... |

FIG. 10B

| ID | Data Name | Reference ID | Priority | Date of Shooting |
|---|---|---|---|---|
| S1 | X-1 | 1 | — | 2002/10/1 10:50 |
| S2 | Z-1 | 5 | A | 2002/10/1 12:05 |
| S3 | P-1 | 7 | B | 2002/10/1 12:12 |
| S4 | P-2 | 8 | B | 2002/10/1 13:43 |
| S5 | Z-2 | 6 | A | 2002/10/2 10:50 |
| S6 | X-2 | 2 | — | 2002/10/3 14:03 |
| ... | ... | ... | ... | ... |

FIG. 12
| ID | Data Name | Extension | Type | Device ID | Date of Shooting |
|---|---|---|---|---|---|
| 1 | C-1 | jpg | Image | DSC-X | 2002/10/1 10:50 |
| 2 | C-2 | jpg | Image | DSC-X | 2002/10/1 14:03 |
| 3 | C-3 | jpg | Image | DSC-X | 2002/10/1 17:02 |
| 4 | C-4 | jpg | Image | DSC-X | 2002/10/10 11:37 |
| ... | ... | ... | ... | ... | ... |
FIG. 13
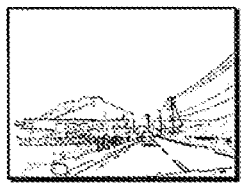
C-1
2002/10/1
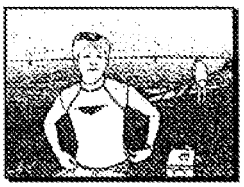
C-2
2002/10/1
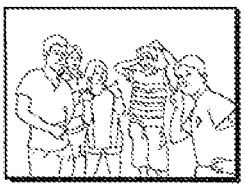
C-3
2002/10/1
C-4
2002/10/10

| ID | Data Name | Extension | Type | MID | Attention | Attribute Type | Similar Person | Similarity (%) |
|---|---|---|---|---|---|---|---|---|
| 1 | C-1 | jpg | Image | – | – | – | – | – |
| 2 | C-2 | jpg | Image | 1 | 1 | human | Mike | 98 |
| 3 | C-3 | jpg | Image | 1 | 0 | human | James | 71 |
|   |   |   |   | 2 | 0 | human | (unknown) | – |
|   |   |   |   | 3 | 0 | human | (unknown) | – |
|   |   |   |   | 4 | 0 | human | Kevin | 54 |
|   |   |   |   | 5 | 1 | human | Mike | 88 |
| 4 | C-4 | jpg | Image | 1 | 1 | human | Alice | 47 |
| ... | ... | ... | ... | ... | ... | ... | ... | ... |

(b)

| Priority |
|---|
| – |
| – |
| B |
| – |
| – |
| C |
| – |
| A |
| ... |

FIG. 19

| ID | Attribute | Correction Value |
|---|---|---|
| 1 | family | +0.20 |
| 2 | friend | +0.10 |
| ... | ... | ... |

FIG. 20

| ID | Name | Address | Attribute | Owned-Device ID | Closeness |
|---|---|---|---|---|---|
| 0 | Mike | mike@xxx.com | owner | DSC-X | — |
| 1 | Alice | alice@aaa.com | friend | DSC-Z, HS-A | 0.93 |
| 2 | Julia | julia@jjj.com | family | TV-J | 0.99 |
| 3 | Tom | tom@ttt.com | family | DSC-T, UUU | 0.73 |
| 4 | Paul | paul@ppp.com | friend | CM-P | 0.61 |
| 5 | James | james@yyy.com | friend | DSC-Y | 0.52 |
| 6 | Dan | dan@ddd.com | — | CM-D | 0.18 |
| 7 | Kevin | kevin@kkk.com | — | DSC-K | 0.06 |
| ... | ... | ... | ... | ... | ... |

FIG. 22

| ID | Data Name | Date of Shooting | Attention | Relation Group | Persons in Picture | Candidate for Provision |
|----|-----------|------------------|-----------|----------------|--------------------|-------------------------|
| 1 | C-1 | 2002/10/1 10:50 | — | 1 | Mike | James (B) |
| 2 | C-2 | 2002/10/1 14:03 | Mike | | James | Julia (A) @ Mike |
| 3 | C-3 | 2002/10/1 17:02 | Mike | | Kevin | |
| 4 | C-4 | 2002/10/10 11:37 | Alice | 2 | Alice | Alice (A) |
| ... | ... | ... | ... | ... | ... | ... |

| ID | Device ID | Device Type | Image Taking | Data Reception |
|---|---|---|---|---|
| 1 | DSC-X | Digital Still Camera | ○ | ○ |
| 2 | DSC-Y | Digital Still Camera | ○ | × |
| 3 | DSC-Z | Digital Still Camera | ○ | × |
| 4 | HS-A | Home Server | × | ○ |
| 5 | PVR-B | Personal Video Recorder | × | ○ |
| 6 | TV-C | Television | × | × |
| 7 | CM-D | Compact Movie | ○ | × |
| 8 | TV-J | Television | × | ○ |
| 9 | DSC-K | Digital Still Camera | ○ | × |
| 10 | CM-P | Compact Movie | ○ | × |
| 11 | DSC-T | Digital Still Camera | ○ | × |
| 12 | HS-T | Home Server | × | ○ |
| 13 | DSC-V | Digital Still Camera | ○ | ○ |
| ... | ... | ... | ... | ... |

(b)

| Device Owner |
|---|
| Mike |
| James |
| Alice |
| Alice |
| -- |
| -- |
| Dan |
| Julia |
| Kevin |
| Paul |
| Tom |
| Tom |
| -- |
| ... |

FIG. 27A

| ID | Sub-attribute | Correction Value |
|---|---|---|
| 1 | parent | +0.10 |
| 2 | husband / wife (spouse) | +0.10 |
| 3 | brother / sister | +0.08 |
| 4 | child / son | +0.08 |
| 5 | uncle / aunt | +0.05 |
| 6 | grandfather / grandmother | +0.05 |
| 7 | cousin / nephew | +0.03 |
| ... | ... | ... |

FIG. 27B

| ID | Sub-attribute | Correction Value |
|---|---|---|
| 1 | home | +0.10 |
| 2 | office | +0.05 |
| 3 | school | +0.05 |
| 4 | hobby / culture | +0.05 |
| 5 | premium place | +0.03 |
| ... | ... | ... |

FIG. 28

| ID | Name | Address | Attribute | Sub-attribute | Owned-Device ID | Closeness |
|---|---|---|---|---|---|---|
| 0 | Mike | mike@xxx.com | owner | — | DSC-X | — |
| 1 | Alice | alice@aaa.com | friend | school | DSC-Z, HS-A | 0.99 |
| 2 | Julia | julia@jjj.com | family | grandmother | TV-J | 0.99 |
| 3 | Tom | tom@ttt.com | family | parent | DSC-T, HS-T | 0.83 |
| 4 | Paul | paul@ppp.com | friend | — | CM-P | 0.61 |
| 5 | James | james@yyy.com | friend | — | DSC-Y | 0.52 |
| 6 | Dan | dan@ddd.com | — | — | CM-D | 0.18 |
| 7 | Kevin | kevin@kkk.com | — | — | DSC-K | 0.06 |
| ⋮ | ⋮ | ⋮ | ⋮ | ⋮ | ⋮ | ⋮ |

FIG. 29

| ID | Data Name | Date of Shooting | Attention | Relation Group | Persons in Picture | Candidate for Provision |
|---|---|---|---|---|---|---|
| 1 | C-1 | 2002/10/1 10:50 | — | 1 | Mike | James (B) |
| 2 | C-2 | 2002/10/1 14:03 | Mike | | James | Julia (A) @ Mike |
| 3 | C-3 | 2002/10/1 17:02 | Mile | | Kevin | Tom (A) @ Mike |
| 4 | C-4 | 2002/10/10 11:37 | Alice | 2 | Alice | Alice (A) |
| ... | ... | ... | ... | ... | ... | ... |

FIG. 30A

| Priority Level | Data Conversion Rate |
|---|---|
| A | 100 % |
| B | 50 % |
| ... | ... |

FIG. 30B

| ID | Sub-attribute | Data Conversion Rate |
|---|---|---|
| 1 | parent | 75 % |
| 2 | husband / wife (spouse) | 100 % |
| 3 | brother / sister | 75 % |
| 4 | child / son | 50 % |
| 5 | uncle / aunt | 50 % |
| 6 | grandfather / grandmother | 150 % |
| 7 | cousin / nephew | 50 % |
| ... | ... | ... |

FIG. 31

| ID | Recipient | Date Sent | | Relation Group | Transmitted Data | Data Conversion Rate |
|---|---|---|---|---|---|---|
| 1 | James | 2002/11/1 | 12:00 | 1 | C-1, C-2, C-3 | 50 % |
| 2 | Julia | 2002/11/1 | 12:00 | 1 | C-1, C-2, C-3 | 150 % |
| 3 | Tom | 2002/11/1 | 12:01 | 1 | C-1, C-2, C-3 | 75 % |
| 4 | Alice | 2002/11/1 | 12:01 | 2 | C-4 | 100 % |
| ... | ... | ... | | ... | ... | ... |

FIG. 33

| ID | Data Name | Extension | Type | Device ID | Date of Shooting |
|----|-----------|-----------|-------|-----------|------------------|
| 1  | C-1       | jpg       | Image | DSC-X     | 2002/10/1  09:15 |
| 2  | C-2       | jpg       | Image | DSC-X     | 2002/10/1  10:03 |
| 3  | C-3       | jpg       | Image | DSC-X     | 2002/10/1  10:05 |
| 4  | C-4       | jpg       | Image | DSC-X     | 2002/10/1  12:32 |
| 5  | C-5       | jpg       | Image | DSC-X     | 2002/10/1  12:33 |
| 6  | C-6       | jpg       | Image | DSC-X     | 2002/10/1  13:07 |
| 7  | C-7       | jpg       | Image | DSC-X     | 2002/10/1  14:44 |
| 8  | C-8       | jpg       | Image | DSC-X     | 2002/10/1  19:10 |
| 9  | C-9       | jpg       | Image | DSC-X     | 2002/10/2  09:50 |
| 10 | C-10      | jpg       | Image | DSC-X     | 2002/10/2  11:22 |
| ... | ...      | ...       | ...   | ...       | ...              |

FIG. 34

| ID | Name  | Address          | Owned-Device ID | Closeness |
|----|-------|------------------|-----------------|-----------|
| 0  | Mike  | mike@xxx.com     | DSC-X           | —         |
| 1  | Alice | alice@aaa.com    | DSC-Z           | 0.99      |
| 2  | Julia | julia@jjj.com    | TV-J            | 0.99      |
| 3  | Tom   | tom@ttt.com      | DSC-T           | 0.83      |
| 4  | Paul  | paul@ppp.com     | CM-P            | 0.61      |
| 5  | James | james@yyy.com    | DSC-Y           | 0.52      |
| 6  | Dan   | dan@ddd.com      | CM-D            | 0.18      |
| 7  | Kevin | kevin@kkk.com    | DSC-K           | 0.06      |
| ... | ...  | ...              | ...             | ...       |

FIG. 36

| Device | 8 | 9 | 10 | 11 | 12 | 13 | 14 | 15 | 16 | 17 | 18 | 19 | 20 |
|---|---|---|---|---|---|---|---|---|---|---|---|---|---|
| DSC-Y |  | ● | ● | ● | ● | ● | ● | ● | ● |  |  |  |  |
| CM-P | ● | ● | ● | ● |  |  |  |  | ● | ● | ● | ● |  |
| DSC-K |  | ● | ● | ● |  |  |  |  |  |  |  |  |  |
| DSC-V |  |  |  |  |  |  |  |  | ● | ● | ● | ● | ● |

FIG. 38

| Date | 8 | 9 | 10 | 11 | 12 | 13 | 14 | 15 | 16 | 17 | 18 | 19 | 20 |
|---|---|---|---|---|---|---|---|---|---|---|---|---|---|
| 2002/10/1 | | C-1 | C-2 | | C-4 | C-6 | C-7 | | | | | C-8 | |
| | | | C-3 | | C-5 | | | | | | | | |

FIG. 40

| ID | Data Name | Extension | Type | Device ID | Date of Shooting | Location of Shooting |
|---|---|---|---|---|---|---|
| 1 | C-1 | jpg | Image | DSC-X | 2002/10/1 09:15 | |
| 2 | C-2 | jpg | Image | DSC-X | 2002/10/1 09:52 | |
| 3 | C-3 | jpg | Image | DSC-X | 2002/10/1 10:05 | |
| 4 | C-4 | jpg | Image | DSC-X | 2002/10/1 10:25 | |
| 5 | C-5 | jpg | Image | DSC-X | 2002/10/1 12:33 | |
| 6 | C-6 | jpg | Image | DSC-X | 2002/10/1 13:07 | |
| 7 | C-7 | jpg | Image | DSC-X | 2002/10/1 14:44 | |
| 8 | C-8 | jpg | Image | DSC-X | 2002/10/1 19:10 | |
| 9 | C-9 | jpg | Image | DSC-X | 2002/10/2 09:50 | |
| 10 | C-10 | jpg | Image | DSC-X | 2002/10/2 11:22 | |
| ... | ... | ... | ... | ... | ... | ... |

FIG. 43

| | DSC-X @Mike | DSC-Y @James | CM-P @Paul |
|---|---|---|---|
| 09:00 | 34.98556,135.75845 | 34.98557,135.75844 | 34.98557,135.75844 |
| 09:15 | 35.00075,135.74286 | 35.00065,135.74282 | 35.00074,135.74285 |
| 09:30 | 35.01197,135.75123 | 35.01199,135.75128 | 35.01198,135.75120 |
| 09:45 | 35.01260,135.74269 | 35.01261,135.74268 | 35.01261,135.74270 |
| 10:00 | 35.01787,135.74248 | 35.01790,135.74288 | 35.01777,135.74256 |
| 10:15 | 35.01843,135.73175 | 35.01734,135.75720 | 35.01473,135.7002 |
| 10:30 | 35.03165,135.73141 | 35.02972,135.75248 | 35.02294,135.73456 |
| 10:45 | 35.03910,135.73153 | 35.02908,135.7695 | 35.02929,135.7554 |
| ... | ... | ... | ... |

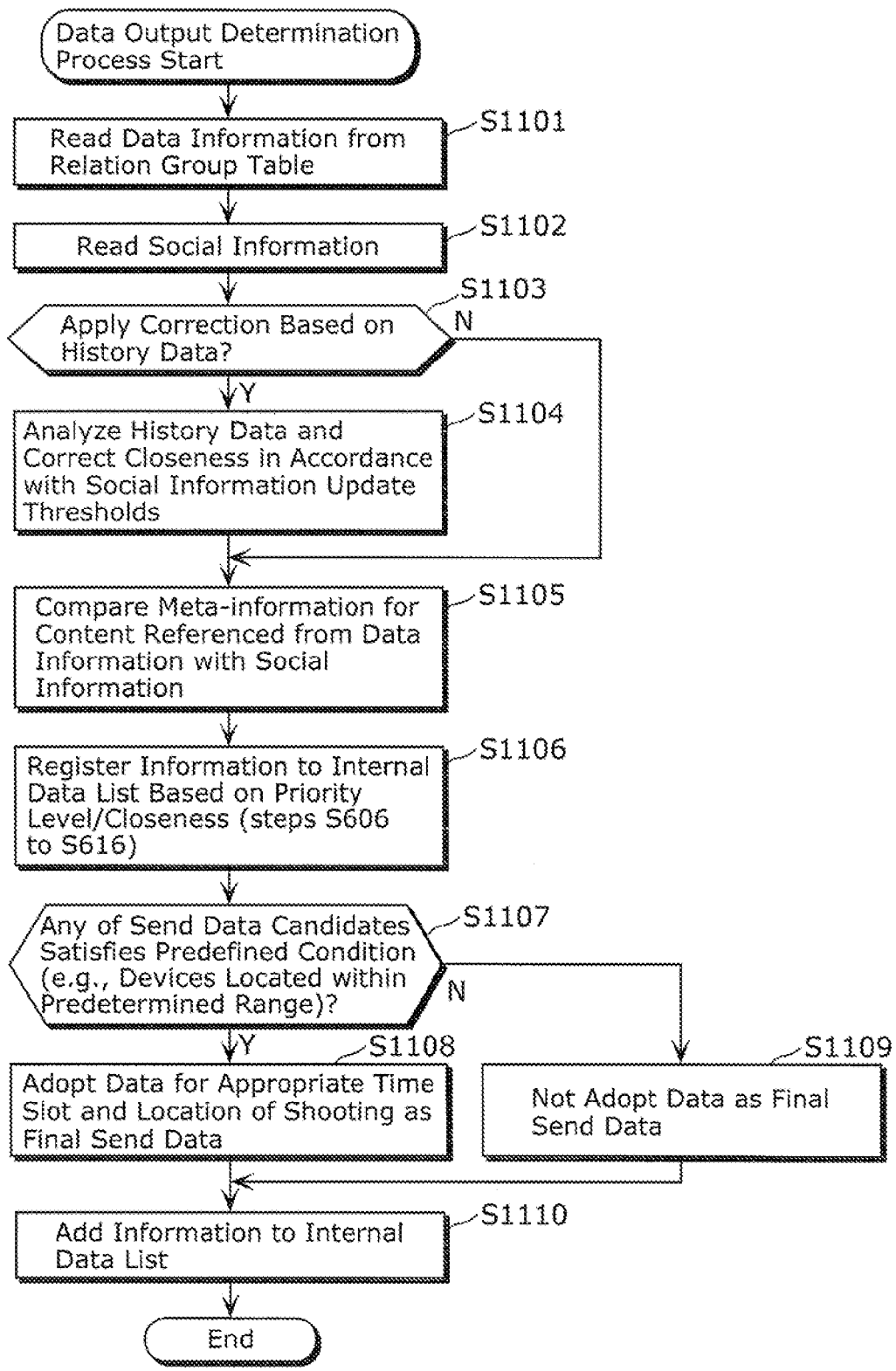

FIG. 45A

| ID | Condition | Threshold | Correction Value |
|---|---|---|---|
| 1 | Stay in Same Area: Total Time | 50 Hours or Longer | +0.03 |
| 2 | Stay in Same Area: Place Value | 50 Hours or Longer | See Another Table |
| 3 | Communication Between Same Devices: Total Number of Times | Every 100 Communications | +0.03 |
| 4 | Communication Between Same Devices: Content Value | Level 3 or Higher | +0.01 |
| 5 | Communication Between Same Devices: Time Slot | Every 50 Hours of Prime-time Call | +0.01 |
| 6 | Communication Between Same Devices: Total Time of No Communication | Every 3,000 Hours | -0.01 |
| ... | ... | ... | ... |

FIG. 45B

| ID | Place | General Recognition | Correction Value |
|---|---|---|---|
| 1 | Registered for School Address | Friend at School | +0.05 |
| 2 | Registered for Home Address | Family, Relatives, Acquaintances, Friends | +0.02 |
| 3 | Registered for Corporation Address | Boss, Colleagues, and Juniors at Office | +0.01 |
| 4 | Expensive Restaurant Address | Important Person, Important Customer | +0.03 |
| 5 | Theme Park Address | Family, Girl/boyfriend | +0.03 |
| ... | ... | ... | ... |

FIG. 46

| Priority Level | Threshold |
|---|---|
| A | Within 3 km |
| B | Within 1 km |
| ... | ... |

FIG. 47

|  | DSC-X & DSC-Y (A) | | DSC-X & CM-P (B) | |
|---|---|---|---|---|
| 09:00 | 10 m | ○ | 10 m | ○ |
| 09:15 | 10 m | ○ | 10 m | ○ |
| 09:30 | 20 m | ○ | 20 m | ○ |
| 09:45 | 50 m | ○ | 50 m | ○ |
| 10:00 | 120 m | ○ | 120 m | ○ |
| 10:15 | 1,500 m | ○ | 1,500 m | × |
| 10:30 | 2,880 m | ○ | 3,880 m | × |
| 10:45 | 8,650 m | × | 4,650 m | × |
| ... | ... | | ... | |

FIG. 51

| Item | Value |
| --- | --- |
| User Name | Alice |
| Nickname | Alice |
| Address | alice@aaa.com |
| Owned-Device ID | DSC-Z |
| Icon | http://alice_abc.com/icon/alice.png |
| Web Site/Blog | http://alice_abc.com/blog/ |
| SNS Name | mySns.com |
| SNS Login Name | alice |
| Keyword | Cake,Hawai,Yoga |
| ... | ... |

DATA PROCESSING APPARATUS AND DATA PROCESSING METHOD

TECHNICAL FIELD

The present invention relates to a data processing apparatus and the like that outputs accumulated content data, such as still or moving images, and particularly to a data processing apparatus and a data processing method that output data using social information.

BACKGROUND ART

In recent years, image taking devices, such as consumer digital still cameras, video cameras, and built-in cameras of mobile phones, provide increasingly high functionality. These image taking devices support sophisticated image taking, such as rapid continuous shooting, in addition to high-quality recording of photographs and/or videos, for example. An image taking device also automatically assigns meta-information, such as position information for the location of shooting or the name of a person in a photograph or video, for example. An image taking device further has network connection functions and directly uploads taken photographs from the device to a server on a network, for example. A wide variety of such high-functionality image taking devices are now available at low costs.

Popularity of these high-functionality image taking devices is a factor to increase private content handled by an individual (e.g., photographs of a family trip or athletic meet, a video of a recital, etc.). Furthermore, as the image quality or added value of content is improved, the number of contents and size of individual contents are explosively increasing as well.

To share such photographs or videos with family, relatives, friends, or those who attended the event after taking, the one who took the pictures directly sends photograph or video data to them by electronic mail, for example. He also uploads photograph or video data to a server on a network, for example.

These tasks, however, impose an increasing operational burden on the user as the number of people to whom the user wants to send data increases. Thus, to facilitate these tasks, such a scheme is proposed that recognizes and looks up subjects included in individual taken images and assigns addresses that are related to subject data in advance so that the user can send image data to the corresponding person by choosing a person included in an image as a subject (see Patent Literature 1, for instance).

CITATION LIST

Patent Literature

[PTL 1] Japanese Unexamined Patent Application Publication No. 2009-206774

SUMMARY OF INVENTION

Technical Problem

The conventional configuration mentioned above, however, searches for an address that is related beforehand to a person's face detected in individual image data and displays the person as a candidate for transmission. Thus, the configuration has a problem that the address of a person as a candidate for transmission depends on face information included in individual image data and persons who are not included in the image data cannot be selected as candidates for transmission.

For example, when a child who is someone's grandchild is in a photograph, it may be desired to send the picture to his grandparents who look forward to their grandchild's pictures. Because the grandparents who are not in the photograph cannot be selected as candidates for transmission, however, the sender needs to take the trouble to choose the grandparents' address from an address book or the like.

Another problem of the configuration is that it requires the user to specify a destination such as by clicking on an icon representing a candidate for transmission, which is time consuming and also increases an operational burden on the user.

The present invention is intended to solve the existing problems, and an object thereof is to provide a data processing apparatus and a method for the same that can realize data sharing with family members and/or acquaintances while reducing an operational burden on the user.

Solution to Problem

In order to achieve the above-described object, the data processing apparatus according to an aspect of the present invention is a data processing apparatus that includes: a data output determination unit configured to determine whether or not to output the content data using social information including (i) closeness indicating a degree of familiarity between certain users and (ii) information for associating the content data with the closeness; and a data output unit configured to output the content data when the data output determination unit determines to output the content data, wherein the data output determination unit is configured to refer to the social information and determine to output the content data associated with the closeness when the closeness is equal to or greater than a predetermined threshold.

According to this configuration, relationship between the user as the social information owner and another user is determined using closeness represented as a numerical value in the social information and whether to output content data or not is determined based on the result of determination. This enables such control to permit viewing and provision of target data only when closeness exceeds a predetermined threshold, for example, saving the user from an as operational burden such as the user choosing desired target data from a large amount of target data by himself. In addition, content data relating to a close user can be outputted for viewing or the like. This can realize data sharing with family members or acquaintances while reducing the operational burden on the user.

In addition, the data processing apparatus further includes a data relation extraction unit configured to extract information indicating a relationship between pieces of content data, wherein the data output determination unit is further configured to determine to output content data that has a predetermined relationship indicated by information extracted by the data relation extraction unit.

With this configuration, whether to output content data or not is determined depending on whether pieces of content data have a certain relationship between them or not. This enables such control to permit viewing and provision of only content data that was recorded on a particular day based on date/time of shooting of content data, for example, saving the user from an operational burden, such as the user choosing desired target data from a large amount of target data by himself. In addition, content data recorded on a particular day can be outputted such as for viewing. This can realize data sharing with family members or acquaintances while reducing an operational burden on the user.

In addition, it is preferable that the data processing apparatus further includes: a recognition dictionary storage unit configured to store a recognition dictionary for recognizing an object included in the content data; and an object analysis unit configured to extract an object included in the content data using the recognition dictionary, wherein the data output determination unit is further configured to determine to output the content data to an external apparatus that corresponds to a user that is relevant to the object extracted by the object analysis unit and has the closeness equal to or greater than the predetermined threshold among users associated by the social information.

With this configuration, a user who is relevant to an object included in at least one piece of content data and who has a closeness equal to or greater than a predetermined threshold is selected based on social information, and whether to provide the content data to an external apparatus associated with the user or not is determined. This can automate the process of content data sharing while reducing an operational burden on the user.

In addition, when the content data includes a particular facial object, such control is possible that selects a user who has a close relationship with the particular person extracted as a user relevant to the facial object, as a candidate for transmission. Thus, content data can be sent to a close user even when the user is not included as an object in the content data.

In addition, even when a particular facial object is not included in content data of interest, whether to provide the data or not is determined depending on whether a user is relevant to the object or not. Thus, photograph data taken before and after taking a photograph containing a face, such as a scenic picture taken during a travel, can be provided together, and photograph data including context of an event that cannot be conveyed only by photograph data including a particular facial object can be sent together.

In addition, it is preferable that the data processing apparatus further includes a communication unit configured to perform communication with the external apparatus via a communication network, wherein the data output unit is configured to output the content data to the external apparatus via the communication unit.

This configuration enables control to send data whose data provision has been permitted based on the result of determination to the external apparatus.

In addition, it is preferable that the data processing apparatus further includes a data conversion unit configured to convert the content data into an arbitrary format, wherein the data output determination unit is further configured to cause the data conversion unit to convert the content data in accordance with the closeness and determine to output the content data, and the data output unit is configured to output the content data converted by the data conversion unit in accordance with a result of determination by the data output determination unit.

With this configuration, content data is converted in accordance with closeness of the user as a candidate for provision and outputted. Thus, for grandparents who have high closeness and poor eyesight, for example, data is converted based on a closeness which specifies enlargement of pictures so as to make their grandchild's face looks large. For less close persons, such control is possible to convert data into a small image for transmission just for a notice. This allows appropriate content data to be converted into an appropriate format and sent to close users without imposing operational burden on the user in specifying conversion of content data specifically to the relationship with or characteristics of a person to whom the data is sent.

In addition, it is preferable that the data processing apparatus further includes an adjacency history management unit configured to acquire, as adjacency history information, a history of short range communication with the external apparatus performed via the communication unit, wherein the data output determination unit is further configured to determine to output the content data to an external apparatus that performed short range communication indicated in the adjacency history information and that corresponds to a user having the closeness equal to or greater than the predetermined threshold among users associated by the social information.

With this configuration, content data is outputted to an external apparatus that performs short range communication and that corresponds to a user having a closeness equal to or greater than a predetermined threshold among users who are associated by social information. This enables identification of an acquaintance's device that was present nearby when content data was generated during a travel, for example, allowing such control to send only pictures taken in a time slot in which the acquaintance and the user were together to the acquaintance's device. This allows data corresponding to history of actual acts to be sent to close users without imposing operational burden on the user in selecting data that was generated in time slots in which they were together.

In addition, it is preferable that the data processing apparatus further includes a social information update unit configured to acquire status information indicating whether or not the external apparatus is able to receive the content data via the communication unit, and update the social information including the status information, wherein the data output determination unit is further configured to determine whether or not to output the content data using the status information included in the social information updated most recently by the social information update unit.

With this configuration, since whether data should be provided or not is determined using social information reflecting the latest status information that indicates whether an external apparatus can receive content data or not, content data can be sent to an external apparatus that is able to receive it and data sharing that reflects relationship between users more accurately can be facilitated.

In addition, it is preferable that the data processing apparatus further includes a social information update unit configured to acquire a latest social information from the external apparatus via the communication unit and update the social information, wherein the as data output determination unit is further configured to determine whether or not to output the content data using the social information updated most recently by the social information update unit.

With this configuration, since whether data should be provided or not is determined using social information including closeness that reflects the latest status, data sharing that reflects relationship between users more accurately can be facilitated and also processing burden involved with analysis processing required for update of closeness on a data processing apparatus can be reduced.

In addition, it is preferable that the data processing apparatus further includes: an application unit configured to execute an application which provides functions for communication with the external apparatus via the communication unit; a data accumulation is unit configured to accumulate a history of processing from execution of the application as history data; and a social information update unit configured to update the closeness included in the social information using at least one of information on a partner of communication, a total communication count, a frequency of access, a trend of increase/decrease in access frequency, and a body of transmitted and received data which are included in the history data, wherein the data output determination unit is further configured to determine whether or not to output the content data using the social information updated most recently by the social information update unit.

With this configuration, closeness included in social information is updated using at least one piece of information on the other party of communication, the total communication count, a frequency of access, a trend of increase/decrease in access frequency, and a body of transmitted and received data, and whether data should be provided or not is determined using the social information including closeness that reflects the latest status. Therefore, data sharing that reflects relationship between users more accurately can be facilitated.

In addition, it is preferable that the data processing apparatus further includes: a sensor configured to detect information on surroundings which indicates a position of the data processing apparatus; a data accumulation unit configured to accumulate history data for results of detection by the sensor; and a social information update unit configured to acquire history data of the information on surroundings for the external apparatus via the communication unit and update the social information of the external apparatus with social information including the history data acquired, wherein the social information update unit is configured to compare history data accumulated by the data accumulation unit to updated history data of the external apparatus, update closeness included in the social information using at least one of a relative distance of position information of the data processing apparatus and the external apparatus, area information, and a trend of increase/decrease in adjacency frequency, and the data output determination unit is further configured to determine whether or not to output the content data using the social information updated most recently by the social information update unit.

With this configuration, closeness included in social information is updated using at least one of a relative distance of position information for the data processing apparatus and an external apparatus, area information, and a trend of increase/decrease in adjacency frequency, and whether data should be provided or not is determined using social information including closeness that reflects the latest status. This enables identification of an acquaintance's device that was present nearby when the data of interest was generated during a travel, for example, allowing such control to send only pictures taken at a location or in a time slot in which the acquaintance and the user were together to the acquaintance's device. This allows data corresponding to history of actual acts to be sent to close users without imposing operational burden on the user in selecting data that was generated in time slots in which they were together by himself.

In addition, it is preferable that the data processing apparatus further includes social information management unit configured to, when a data acquisition and update request from the external apparatus is accepted via the communication unit, acquire data of the recognition dictionary used by the object analysis unit from the external apparatus and update the recognition dictionary, in accordance with the closeness, wherein the object analysis unit is configured to extract an object included in the content data using the recognition dictionary updated by the social information management unit.

With this configuration, data of the recognition dictionary is acquired from an external apparatus and the recognition dictionary is is updated according to closeness, and objects included in content data are extracted using the latest recognition dictionary. That is, in updating, editing, saving, and supply to an external entity of a recognition dictionary used for analysis of objects included in content data and meta-information associated with the recognition dictionary, the relationship between the user who is the information owner of the recognition dictionary and meta-information and the user who requests processing is determined using the closeness between the users represented in social information. This enables such control to permit editing of the recognition dictionary only when a closeness exceeding a predetermined threshold is established for a user who wants to edit the recognition dictionary, for example, and permits editing only by a close user while avoiding malicious editing by an unauthorized user.

In addition, because a recognition dictionary built by close users together can be shared, it is possible to reduce operational burden on the user involved with learning of a recognition dictionary by the user compared with when learning of a recognition dictionary is done on a per-device basis.

In addition, it is preferable that, when two or more pieces of meta-information corresponding to one object that can be extracted by the object analysis unit using the recognition dictionary are associated with the social information, the data output determination unit is further configured to determine to preferentially output meta-information associated with a higher closeness included in the social information, out of the two or more pieces of meta-information, and the data output unit is configured to output the content data and the meta-information which has been determined to be preferentially outputted.

With this configuration, when plural pieces of meta-information are given for one object included in content data through editing by plural users, such control is possible that meta-information given by a user having a higher closeness is preferentially displayed. Accordingly, meta-information that is more reliable and users are interested in can be selected from plural pieces of meta-information.

It should be noted that the present invention can be implemented, in addition to implementation as a data processing apparatus described above, as a data processing method including, as its steps, the characteristic processing units included in the data processing apparatus. Furthermore, the present invention can be implemented as a single or plural integrated circuit including the processing units. Furthermore, the present invention can be implemented as a program which, when loaded into a computer, allows a computer to execute the steps included in the data processing method.

It should be understood that such a program can be distributed via recording medium such as a CD-ROM and transmission medium such as the Internet.

Advantageous Effects of Invention

According to the data processing apparatus of the present invention, data sharing with family members or acquaintances can be realized while reducing an operational burden on the user.

BRIEF DESCRIPTION OF DRAWINGS

FIG. 2 is a diagram showing an example of meta-information for content data according to Embodiment 1 of the present invention.

FIG. 3 is a diagram showing an example of social information to according to Embodiment 1 of the present invention.

FIG. 8 is a diagram showing an example of a relation group table according to Embodiment 1 of the present invention.

FIG. 10A is a diagram showing an example of an internal data list according to Embodiment 1 of the present invention.

FIG. 10B is a diagram showing an example of an internal data list according to Embodiment 1 of the present invention.

FIG. 12 is a diagram showing an example of meta-information for content data according to Embodiment 2 of the present invention.

FIG. 13 is a diagram showing an image of content data according to Embodiment 2 of the present invention.

FIG. 17 is a diagram showing an example of priority levels determined from a result of object recognition and closeness in social information according to Embodiment 2 of the present invention.

FIG. 19 is a diagram showing an example of an attribute correction table according to Embodiment 2 of the present invention.

FIG. 20 is a diagram showing an example of social information according to Embodiment 2 of the present invention.

FIG. 22 is a diagram showing an example of an internal data list according to Embodiment 2 of the present invention.

FIG. 23 is a diagram showing an example of a device attribute table according to Embodiment 2 of the present invention.

FIG. 27A is a diagram showing an example of a sub-attribute correction table according to Embodiment 3 of the present invention.

FIG. 27B is a diagram showing an example of a sub-attribute correction table according to Embodiment 3 of the present invention.

FIG. 28 is a diagram showing an example of social information according to Embodiment 3 of the present invention.

FIG. 29 is a diagram showing an example of an internal data list for a data output determination process according to Embodiment 3 of the present invention.

FIG. 30A is a diagram showing an example of a data conversion table according to Embodiment 3 of the present invention.

FIG. 30B is a diagram showing an example of a data conversion table according to Embodiment 3 of the present invention.

FIG. 31 is a diagram showing an example of data output result according to Embodiment 3 of the present invention.

FIG. 33 is a diagram showing exemplary accumulation of content data according to Embodiment 4 of the present invention.

FIG. 34 is a diagram showing an example of social information according to Embodiment 4 of the present invention.

FIG. 36 is a diagram showing an example of adjacency history information according to Embodiment 4 of the present invention.

FIG. 38 is a diagram showing an example of shooting time as slot distribution according to Embodiment 4 of the present invention.

FIG. 40 is a diagram showing exemplary accumulation of content data according to Embodiment 5 of the present invention.

FIG. 43 is a diagram showing an example of position information history data for each device according to Embodiment 5 of the present invention.

FIG. 44 is a flowchart showing a flow of a data output determination process according to Embodiment 5 of the present invention.

FIG. 45A is a diagram showing an example of a social information update threshold according to Embodiment 5 of the present invention.

FIG. 45B is a diagram showing an example of a social information update threshold according to Embodiment 5 of the present invention.

FIG. 46 is a diagram showing an example of data output thresholds according to Embodiment 5 of the present invention.

FIG. 47 is a diagram showing an example of a result of calculating relative position information according to Embodiment 5 of the present invention.

FIG. 51 is a diagram showing an example of user information

DESCRIPTION OF EMBODIMENTS

The following is a detailed description of embodiments according to the present invention, with reference to the drawings. It is to be noted that, in the diagrams, the same numerals are assigned to the elements which represents substantially the same configuration, and the description that is overlapped will be omitted.

Embodiment 1

Figure 1:
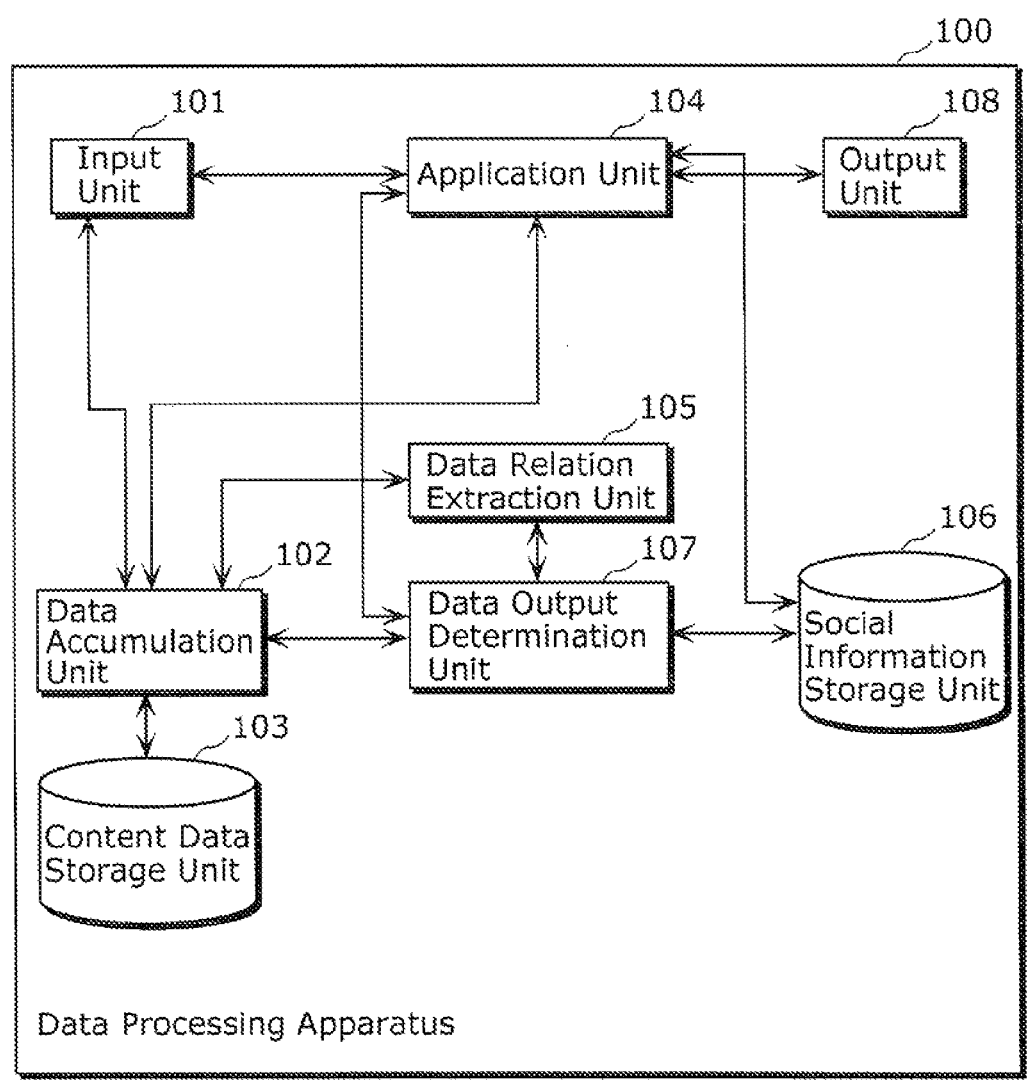
FIG. 1 is a block diagram showing a configuration of a data processing apparatus according to Embodiment 1 of the present invention.

FIG. 1 is a block diagram showing a configuration of a data processing apparatus 100 according to Embodiment 1 of the invention.

In FIG. 1, the data processing apparatus 100 includes an input unit 101, a data accumulation unit 120, a content data storage unit 103, an application unit 104, a data relation extraction unit 105, a social information storage unit 106, a data output determination unit 107, and an output unit 108 (the configuration of Embodiment 1).

The data processing apparatus 100 according to Embodiment 1 is a video recorder or home server into which an external storage medium having content data, such as image data, stored therein can be inserted, a digital still or video camera that can capture content data such as still or moving images, or the like, for example.

The input unit 101 acquires content data to be processed through input means implemented in the data processing apparatus 100 (e.g., an input device for an external storage medium or a built-in as camera module) and transfers the data to the data accumulation unit 102.

The data accumulation unit 102 accumulates content data transferred from the input unit 101 in a storage medium, which is constituted by a hard disk or flash memory, as the content data storage unit 103 in a reloadable format.

The application unit 104 has various functions which are provided by the data processing apparatus 100 to the user thereof (e.g., content viewer display function, slide show play function, print output function), and provides the functions in accordance to an instruction given by the user via the input unit 101. When providing a function, the application unit 104 reads content data at a certain time, accumulated in the content data storage unit 103 by the data accumulation unit 102 and performs desired processing on the data.

The data relation extraction unit 105 reads content data accumulated by the data accumulation unit 102 in the content data storage unit 103, and extracts information indicating a relationship between accumulated pieces of content data as a relationship output result.

The social information storage unit 106 stores social information that represents a relationship with a user who owns or uses the data processing apparatus 100 or a user who is relevant to the user who owns or uses the data processing apparatus 100 even if he himself does not directly utilize the data processing apparatus 100, in a numerical value called closeness. Here, social information refers to information including closeness that indicates the degree of familiarity between certain users and information for associating content data with closeness.

The data output determination unit 107 makes reference to social information and determines that content data associated with closeness should be outputted when the closeness is equal to or greater than a predetermined threshold. Specifically, the data output determination unit 107 determines to output content data that is associated with a closeness equal or greater than the predetermined threshold and that has a predetermined relationship indicated by information extracted by the data relation extraction unit 105. The predetermined threshold is 0.5, for example, when closeness assumes a value from 0 to 1.

More specifically, the data output determination unit 107 requests a relationship output result for target content data from the data relation extraction unit 105 in response to an instruction from the application unit 104. The data output determination unit 107 then determines whether output of the content data is possible or not using the relationship output result and social information stored by the social information storage unit 106. The data output determination unit 107 then returns the result of determination to the application unit 104.

In response to the result of determination from the data output determination unit 107, the application unit 104 then instructs the output unit 108 to output the content data whose data output was determined to be possible, such as by display on a screen. That is, the application unit 104 has a function as a data output unit for outputting content data to the output unit 108 when the data output determination unit 107 has determined to output the content data.

Operations of the data processing apparatus 100 having the above configuration are described next using FIGS. 2 through 10B.

FIG. 2 is a diagram showing an example of meta-information for content data according to Embodiment 1 of the invention.

As shown in FIG. 2($a$), the data accumulation unit 102 maintains a database of several kinds of meta-information indicating the overview of content data accumulated in the content data storage unit 103, and makes the meta-information available for reference and rewriting in response to a request from the data output determination unit 107 and the like.

The meta-information includes, for example, data name that enables access to each data (also called an object identifier or data path), an extension representing file format type, type representing the kind of content data (this embodiment handles only "image" which means a still image, for simplifying description), a device ID uniquely given to a device that generated content data (in this embodiment, expressed in a simple character string like "DSC-X" indicating difference between devices for simplifying description), and data/time of shooting which indicates the time at which content data was generated.

Thus, it is understood that content data recorded by different devices are accumulated in the data accumulation unit 102 together in the data processing apparatus 100 according to the Embodiment 1. FIG. 2(*b*) is described in detail later.

FIG. 3 is a diagram showing an example of social information in Embodiment 1 of the invention.

The social information shown in FIG. 3 is stored in the social information storage unit 106, and includes, for each identification ID, a name representing a name or a nickname of the user who owns or uses the data processing apparatus 100, an addresses representing means of information delivery to the user such as by electronic mail, an owned-device ID uniquely assigned to a device owned by the user, and closeness representing how close the user is to a social information owner. Note that, in FIG. 3, owned-device ID is the information for associating content data with closeness.

It is assumed here that name "Mike" having identification ID "0" is the social, information owner who possesses the data processing apparatus 100, and the value of his closeness is "-" (input of a numerical value is unnecessary). That is, closeness of user "Mike" and that with each user are managed as numerical values from 0 to less than 1.

Note that although the value of closeness is described as a normalized value from 0 to less than 1 herein, the method for managing closeness is not limited thereto. A point system to increase a value without an upper limit or classification into several levels with reduced granularity, e.g., A to E, is also possible.

In addition, although the present description shows an example where "Mike" is the only social information owner, there may be plural social information owners and they can be represented by a similar management scheme.

Figure 4:
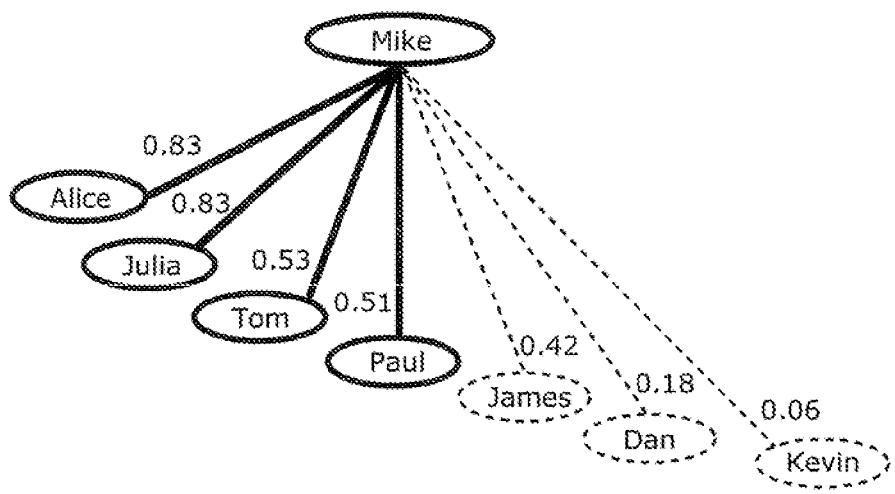
FIG. 4 is a diagram showing node conception for social information according to Embodiment 1 of the present invention.

FIG. 4 is a diagram showing node conception for social information in Embodiment 1 of the invention.

Figure 5:
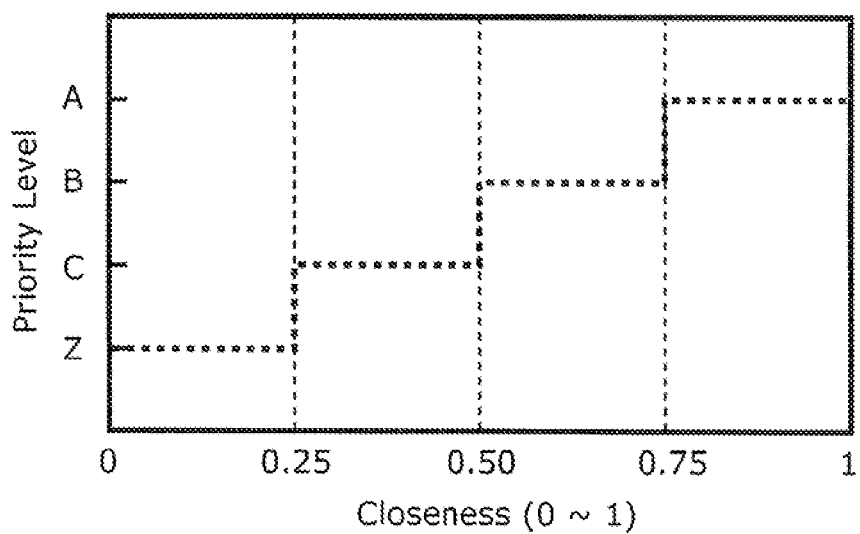
FIG. 5 is a diagram showing an example of a priority determination threshold table according to Embodiment 1 of the present invention.

FIG. 5 is a diagram showing an example of a priority determination threshold table in Embodiment 1 of the invention.

As shown in FIG. 4, social information represents the degree of familiarity between the social information owner "Mike" and each user as a numerical value called closeness. It is assumed here that a greater value means a closer relationship (closer to 1), and a smaller value means a less close relationship (closer to 0).

Here, FIG. 5 shows a priority determination threshold table maintained within the data output determination unit 107, and a priority level for data output to each user is calculated from closeness using thresholds in the table. For example, there are four priority levels, A to C, and Z, and in FIG. 4, "Alice" and "Julia" both have 0.83 and a priority level of A, and "Tom" and "Paul" have 0.53 and 0.51, respectively, and a priority level of B in this example.

Now, a flow of processing for the data output determination unit 107 of the data processing apparatus 100 of the invention to determine whether to output data or not based on a relationship output result and social information is described using FIGS. 6 to 10B.

Figure 6:
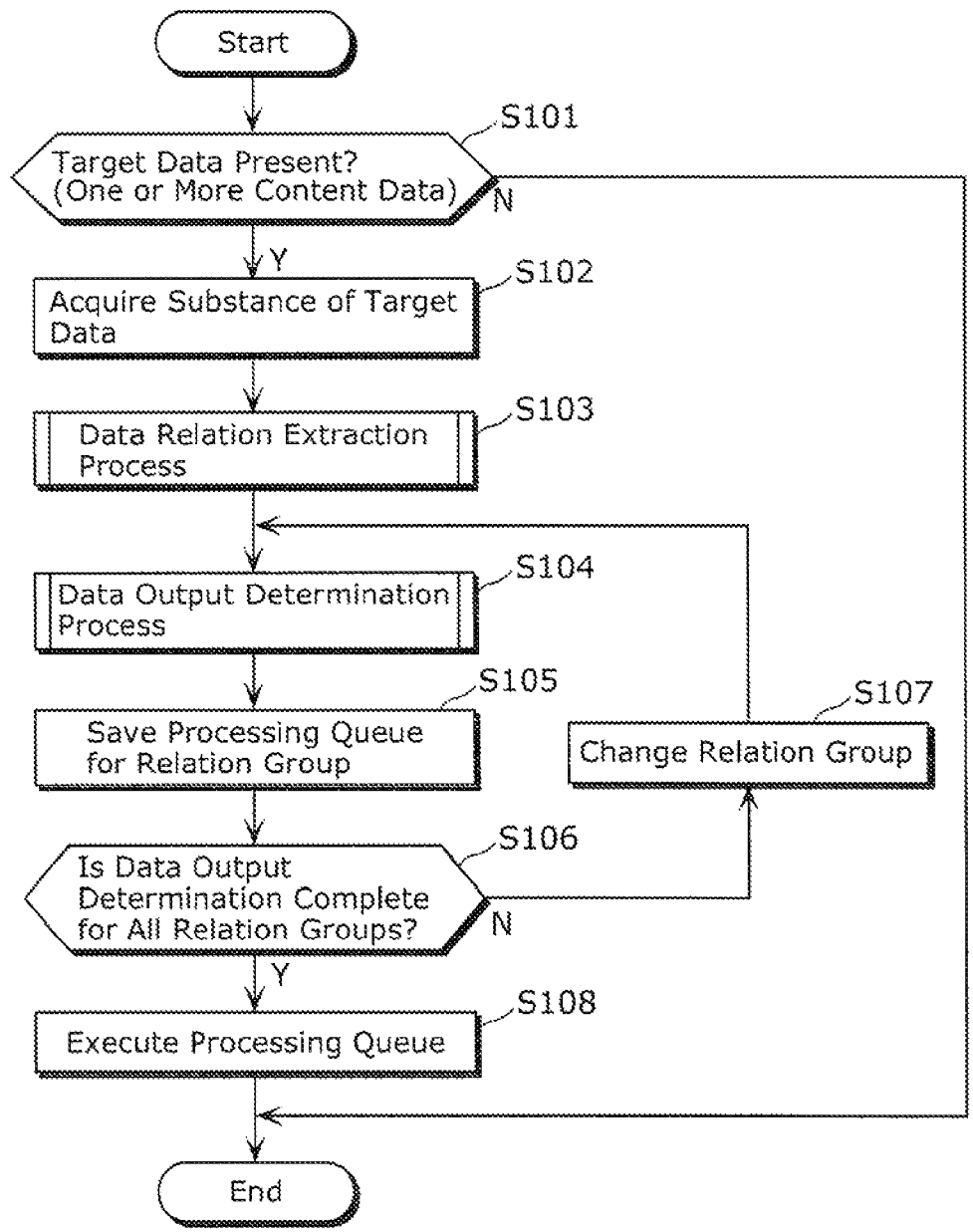
FIG. 6 is a flowchart showing a flow of data processing according to Embodiment 1 of the present invention.

FIG. 6 is a flowchart showing a flow of data processing in Embodiment 1 of the invention.

Figure 7:
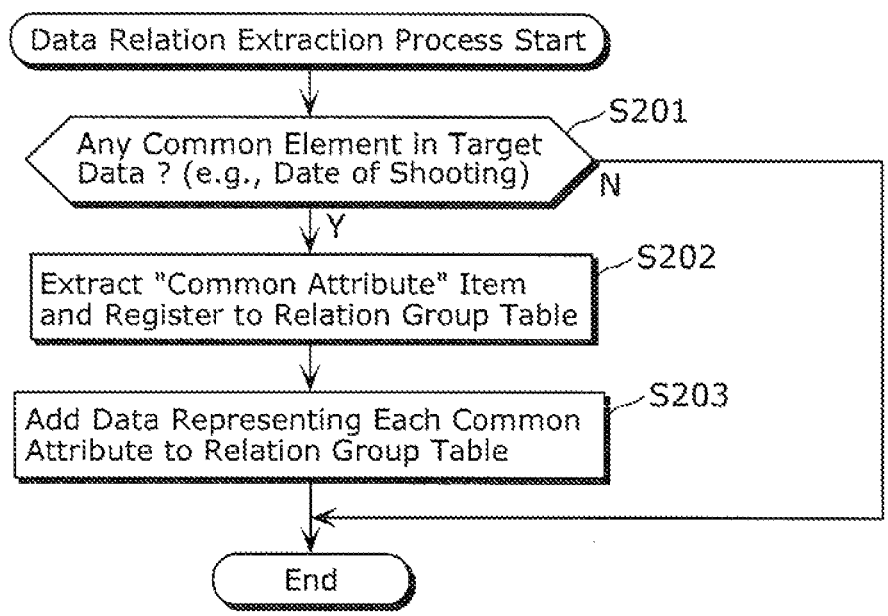
FIG. 7 is a flowchart showing a flow of a data relation extraction process according to Embodiment 1 of the present invention.

FIG. 7 is a flowchart showing a flow of a data relation extraction process in Embodiment 1 of the invention.

FIG. 8 is a diagram showing an example of a relation group table in Embodiment 1 of the invention.

Figure 9:
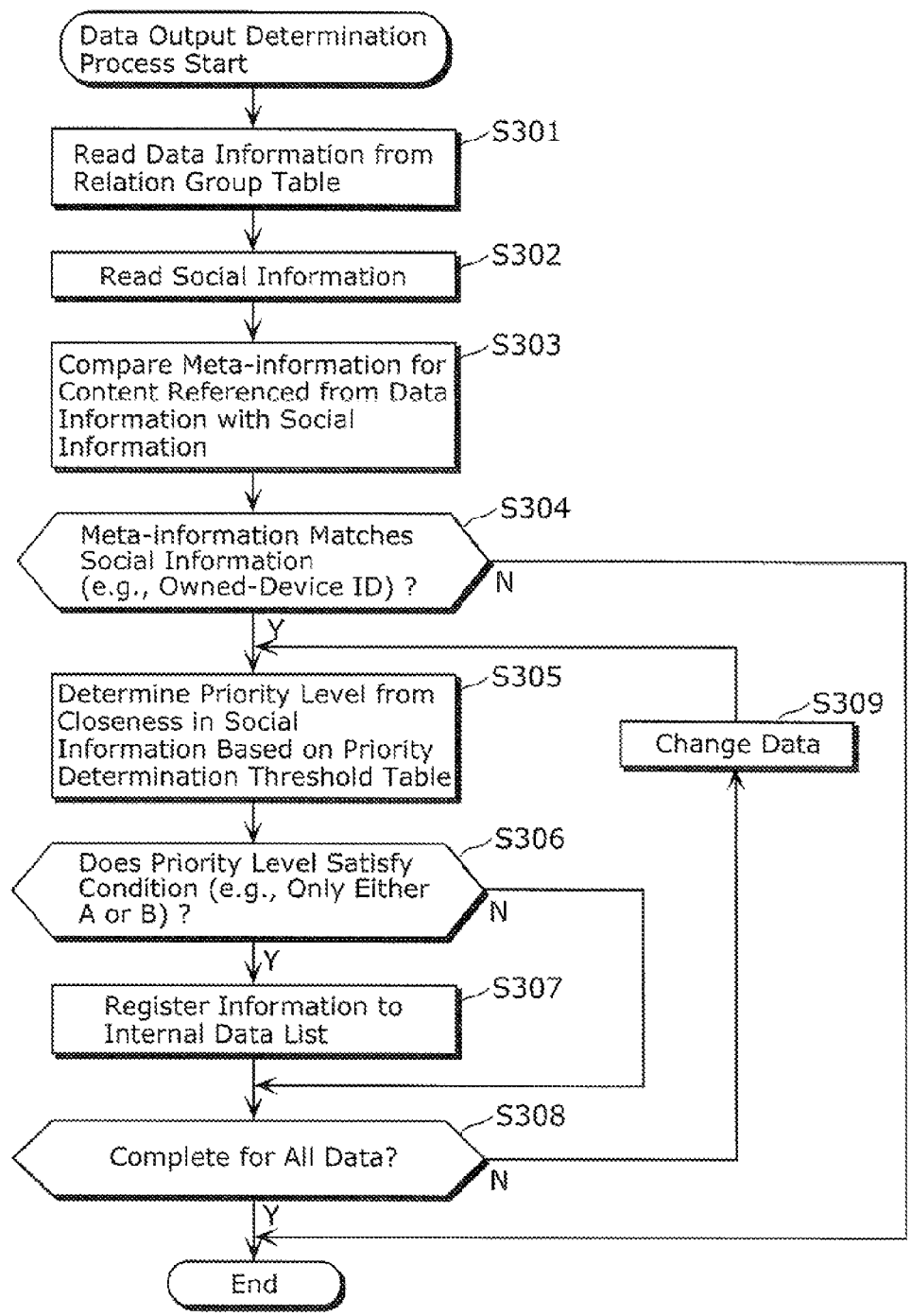
FIG. 9 is a flowchart showing a flow of a data output determination process according to Embodiment 1 of the present invention.

FIG. 9 is a flowchart showing a flow of a data output determination process in Embodiment 1 of the invention.

FIGS. 10A and 10B are diagrams showing examples of an internal data list in Embodiment 1 of the invention.

Here, using FIG. 6, consider a case where the application unit 104 of the data processing apparatus 100 displays a slide show on a screen for a screen saver. Data processing for selecting and displaying content that was generated by users having a close relationship from content data accumulated by the data accumulation unit 102 is described.

First, with image data (content data) inputted via the input unit 101 accumulated by the data accumulation unit 102, the application unit 104 activates any of various functions (a slide-show play function here) at a certain time, such as when there has been no input operation from the user for 10 minutes or longer, and checks with the data accumulation unit 102 whether there is at least one target data that is available for execution of the function (S101).

If there is no target data as a result of step S101 (N at S101), data processing ends. On the other hand, if there is target data (Y at S101), the data relation extraction unit 105 retrieves substance of the target data (S102).

If plural pieces of data are retrieved as the target data, the data relation extraction unit 105 then performs processing for extracting relationship between the pieces of target data (S103). This processing is described later using FIGS. 7 and 8.

The data output determination unit 107 then performs processing for determining whether data should be outputted or not based on a relationship output result extracted by the data relation extraction unit 105 and social information stored by the social information storage unit 106 (S104). This processing is described later using FIGS. 9 and 10.

The data output determination unit 107 saves as a processing queue the result of performing determination on a relation group indicated by the relationship output result extracted by the data relation extraction unit 105 (S105).

The data output determination unit 107 then checks whether determination on data output is complete for all relation groups (S106). If determination is not complete for all relation groups (N at S106), the data output determination unit 107 changes the target relation group (S107), and repeats processing from step S104.

On the other hand, if determination is complete for all relation groups (Y at S106), the data output determination unit 107 notifies the application unit 104 of completion of determination, and the application unit 104 executes the saved processing queue (S108). Here, the application unit 104 uses content data for which data output has been permitted to execute play of a slide show.

Next, flow of processing by the data relation extraction unit 105 shown at step S103 of FIG. 6 is described.

As shown in FIG. 7, the data relation extraction unit 105 determines whether or not there is any meta-information item for the target content data shown in FIG. 2 that can be a common element (S201).

If it determines that there is no common element (N at S201), the data relation extraction unit 105 ends processing for extracting relationship between pieces of target data.

On the other hand, if the data relation extraction unit 105 determines that there is a common element (Y at S201), it registers the extracted common element (e.g., content type and device ID, although this example considers only date of shooting for simplifying description) in the relation group table maintained within the data relation extraction unit 105 as a common attribute (S202).

The data relation extraction unit 105 then adds information indicating content data corresponding to each common attribute to the relation group table (S203).

FIG. 8 shows a relation group table, which is one of relationship extraction results outputted by the data relation extraction unit 105, in which three groups with date of shooting as the common attribute are formed from the content data shown in FIG. 2.

Next, a flow of processing by the data output determination unit 107 shown at step S104 in FIG. 6 is described.

As shown in FIG. 9, the data output determination unit 107 reads data information from the target relation group table shown in FIG. 8 (S301). The data output determination unit 107 further reads social information stored in the social information storage unit 106 (S302).

The data output determination unit 107 next compares meta-information (see FIG. 2) for content data referenced from the data information to the social information it has read (S303), and determines whether or not the meta-information matches the social information (S304).

If it determines that the meta-information does not match the social information (N at S304), the data output determination unit 107 ends the data output determination process. On the other hand, when meta-information, e.g., owned-device ID, matches part of the social information (Y at S304), the data output determination unit 107 determines a priority level from closeness in the social information with reference to the priority determination threshold table shown in FIG. 5 (S305).

The data output determination unit 107 further determines whether the priority level determined satisfies a predefined condition (here, the priority level being only either A or B) or not (i.e., whether the closeness is equal to or greater than a predetermined threshold) (S306). If it is determined that the priority level satisfies the condition (Y at S306), information is registered to the internal data list maintained within the data output determination unit 107 (S307). On the other hand, if it determines that the priority level does not satisfy the condition (N at S306), the data output determination unit 107 does not register the information to the internal data list, and proceeds to the next step (S308).

The data output determination unit 107 then determines whether determination process is complete for all data described in the relation group table or not (S308). If it determines that determination is not complete yet (N at S308), the data output determination unit 107 changes the target data and repeats processing from step S305 (S309). On the other hand, if it determines that determination is complete for all data (Y at S308), the data output determination unit 107 ends the determination process.

To supplement the description on step S305, FIG. 2(b) shows priority levels for respective users referenced using a device ID just for reference. User "Mike" who owns device ID "DSC-X" is the social information owner as shown in FIG. 3, and is not assigned a priority level as "-".

User "James" who has device ID "DSC-Y" has a closeness of 0.42 and priority level C, and user "Alice" who owns device ID "DSC-Z" has a closeness of 0.83 and priority level A, and user "Paul" who owns device ID "CM-P" has a closeness of 0.51 and priority level B.

Here, the owner of device ID "DSC-V" has no corresponding information in social information and is an unknown user to the social information owner "Mike", and is assigned no priority level and designated as "unknown".

FIGS. 10A and 10B are diagrams showing examples of the internal data list in Embodiment 1 of the invention.

FIG. 10A shows an example of a result for an internal data list which is outputted after determination on a data set which is indicated by group ID (GID) "G1" in the relation group table shown in FIG. 8 through the process at steps S306 and S307.

As shown in FIG. 10A, only data named Z-1, P-1, and P-2 that have priority level of only either A or B, which satisfy the predefined condition at step S306, are outputted as the internal data list. Since "X-1" is data referenced from device ID "DSC-X" owned by the social information owner "Mike", it is registered in the internal data list with priority level "-".

By modifying the relation group table at steps S106 and S107 in FIG. 6 described above, only content that has a priority level of A or B, or that is owned by the social information owner is selected from the content data shown in FIG. 2 and outputted as the internal data list as shown in FIG. 10B.

That is, by the data output determination unit 107 sending the internal data list outputted back to the application unit 104, contents of display is controlled using the internal data list when the application unit 104 of the data processing apparatus 100 displays a slide show on the screen as a screen saver. This can select and display content generated by users who have a close relationship from content data accumulated by the data accumulation unit 102.

With this configuration, relationship between the user as the social information owner and other users is determined using closeness represented as numerical values in social information, and whether to output content data or not is determined based on the result of determination. This enables control to permit viewing and provision of target data only when closeness exceeds a predetermined threshold, for example, saving the user from operational burden, such as the user choosing desired target data from a large amount of target data by himself. In addition, content data relating to a user who has a close relationship can be outputted for viewing or the like.

In addition, whether to output content data or not is determined depending on whether pieces of content data have a certain relationship between them or not. This enables control to permit viewing and provision of only content data that was recorded on a particular day based on date/time of shooting of content data, for example, saving the user from operational burden such as the user choosing desired target data from a large amount of target data by himself. In addition, content data recorded on a particular day can be outputted for viewing or the like.

These can realize data sharing with family members or acquaintances while reducing operational burden on the user.

Embodiment 2

Figure 11:
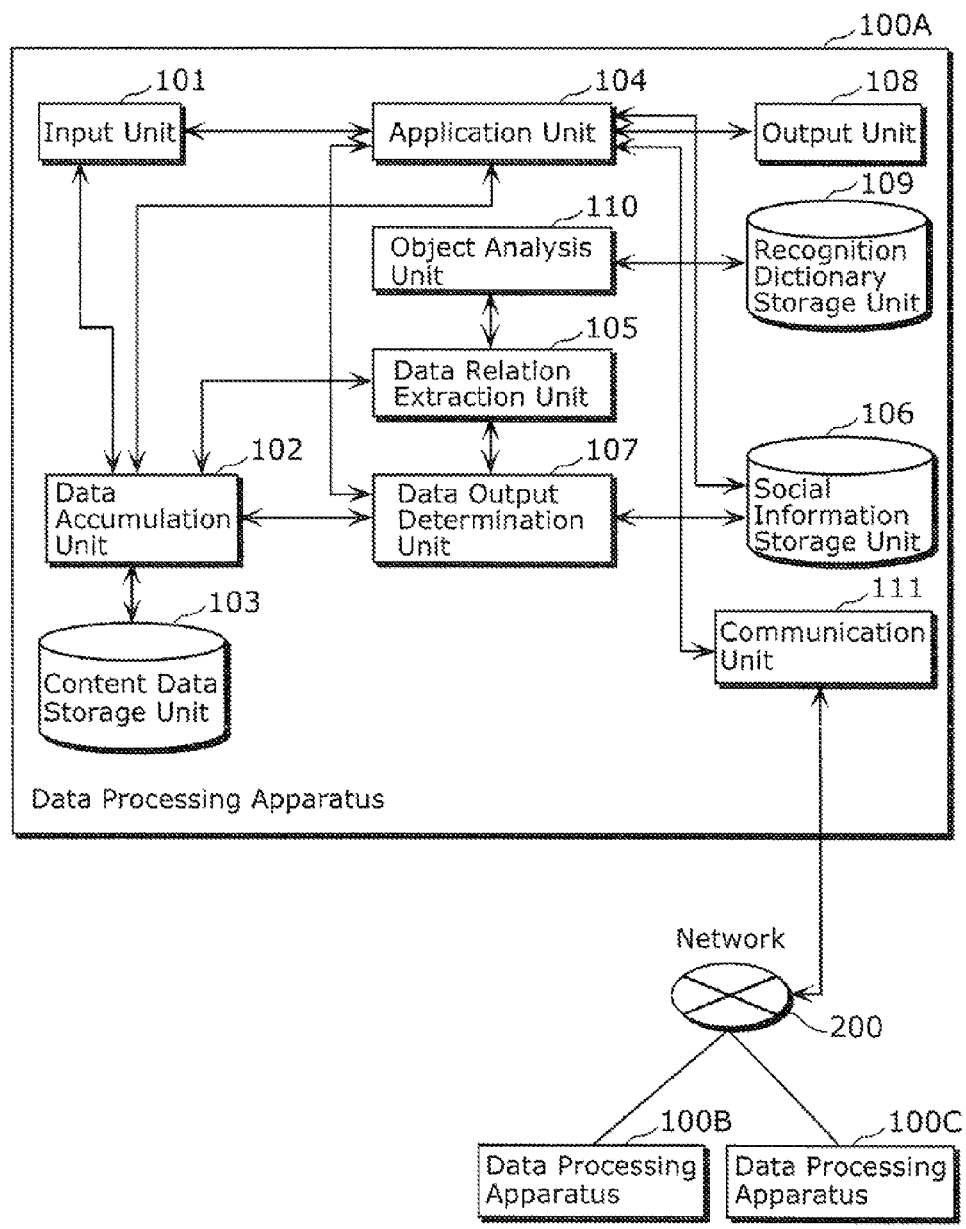
FIG. 11 is a block diagram showing a configuration of a data processing apparatus according to Embodiment 2 of the present invention.

FIG. 11 is a block diagram showing a configuration of a data processing apparatus 100A according to Embodiment 2 of the invention. In FIG. 11, the same reference numerals are used for the same components as in FIG. 1 and their descriptions are omitted.

In FIG. 11, the data processing apparatus 100A has a recognition dictionary storage unit 109, an object analysis unit 110, and a communication unit 111, in addition to the components of FIG. 1. The data processing apparatus 100A is further connected with an external data processing apparatus 100B and a data processing apparatus 100C via a network 200 (the configuration of Embodiment 2).

The data processing apparatus 100A of Embodiment 2 is a video recorder or home server into which an external storage medium with image data stored therein can be inserted and which can accumulate plural pieces of image data that have been read in, a digital still or video camera that is capable of taking and accumulating plural still or moving images, or the like, for example.

The recognition dictionary storage unit 109 is a memory which has stored therein a recognition dictionary for recognizing objects included in content data.

The object analysis unit 110 extracts objects included in content data using the recognition dictionary.

The communication unit 111 performs communication with the data processing apparatus 100B and the data processing apparatus 100C, which are external apparatuses, via the network 200 which is a communication network.

The data output determination unit 107 determines to output content data to an external apparatus corresponding to a user who is relevant to an object extracted by the object analysis unit 110 and who has a closeness equal to or greater than a predetermined threshold, among users associated by social information.

The predetermined threshold is 0.5, for example, when closeness assumes a value between 0 and 1. Users relevant to an to object include not only a user indicated by the object but a user whose closeness with that user is equal to or greater than a predefined value (e.g., 0.95).

In addition, the application unit 104 has a function as a data output unit for outputting content data to an external apparatus via the communication unit 111.

FIG. 12 is a diagram showing an example of meta-information for content data in Embodiment 2 of the invention.

FIG. 13 shows how content data looks like in Embodiment 2 of the invention.

As shown in FIG. 12, Embodiment 2 assumes that the data accumulation unit 102 has accumulated four still pictures taken with device ID "DSC-X" as the latest content data in the content data storage unit 103. The four pieces of content data includes a scenic picture with data name C-1, a portrait picture C-2 which includes only "Mike", a group picture C-3 including "Mike" on the far right and several other people, and a portrait picture C-4 including "Alice", who is a friend of "Mike", as shown in FIG. 13.

Here, consider a case where the application unit 104 of the data processing apparatus 100A according to Embodiment 2 transfers the latest content data accumulated by the data accumulation unit 102 to the external data processing apparatus 100B or the data processing apparatus 100C. The following description shows data processing for selecting and transferring content data which includes a close user as a photographic subject to that user or to a user who is close to the user included in the data as a subject from the latest content data accumulated by the data accumulation unit 102.

Figure 14:
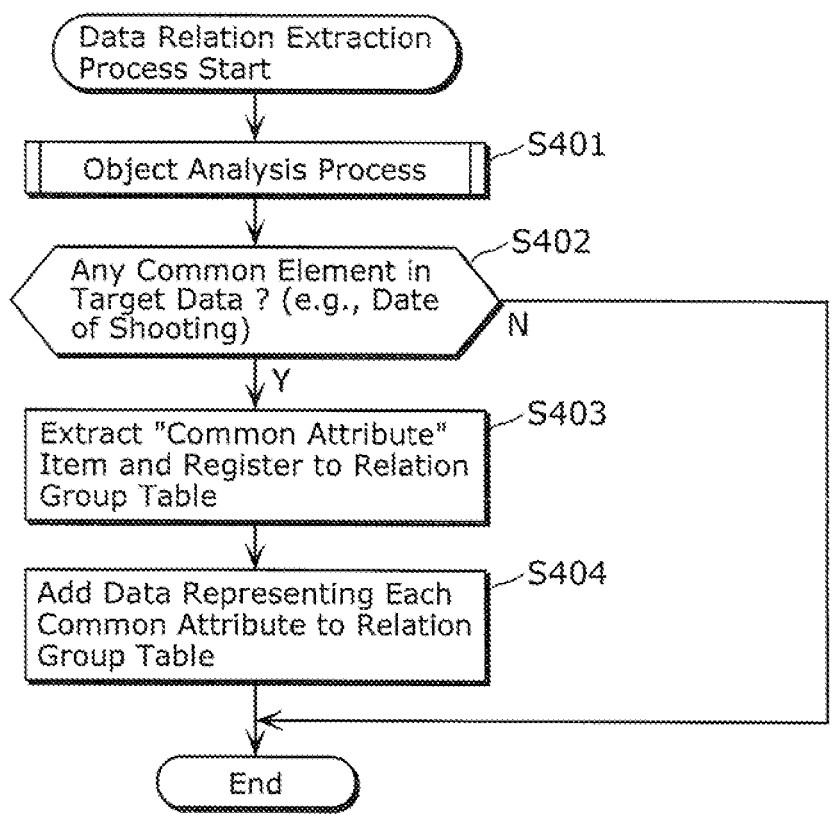
FIG. 14 is a flowchart showing a flow of a data relation extraction process according to Embodiment 2 of the present invention.

FIG. 14 is a flowchart showing a flow of a data relation extracting process in Embodiment 2 of the invention.

The flow of processing by the data relation extraction unit 105 shown in FIG. 14 includes an object analyzing process (S401) for extracting as objects persons, letters on a signboard, cars, animals, and natural objects such as mountains and trees included in target data before the process shown in FIG. 7. As processing at S402 and the subsequent steps is the same as at S201 and the following steps in FIG. 7, its description is omitted.

Hereinafter, the object analyzing process (S401 in FIG. 14) is described in detail using FIGS. 15 to 17.

Figure 15:
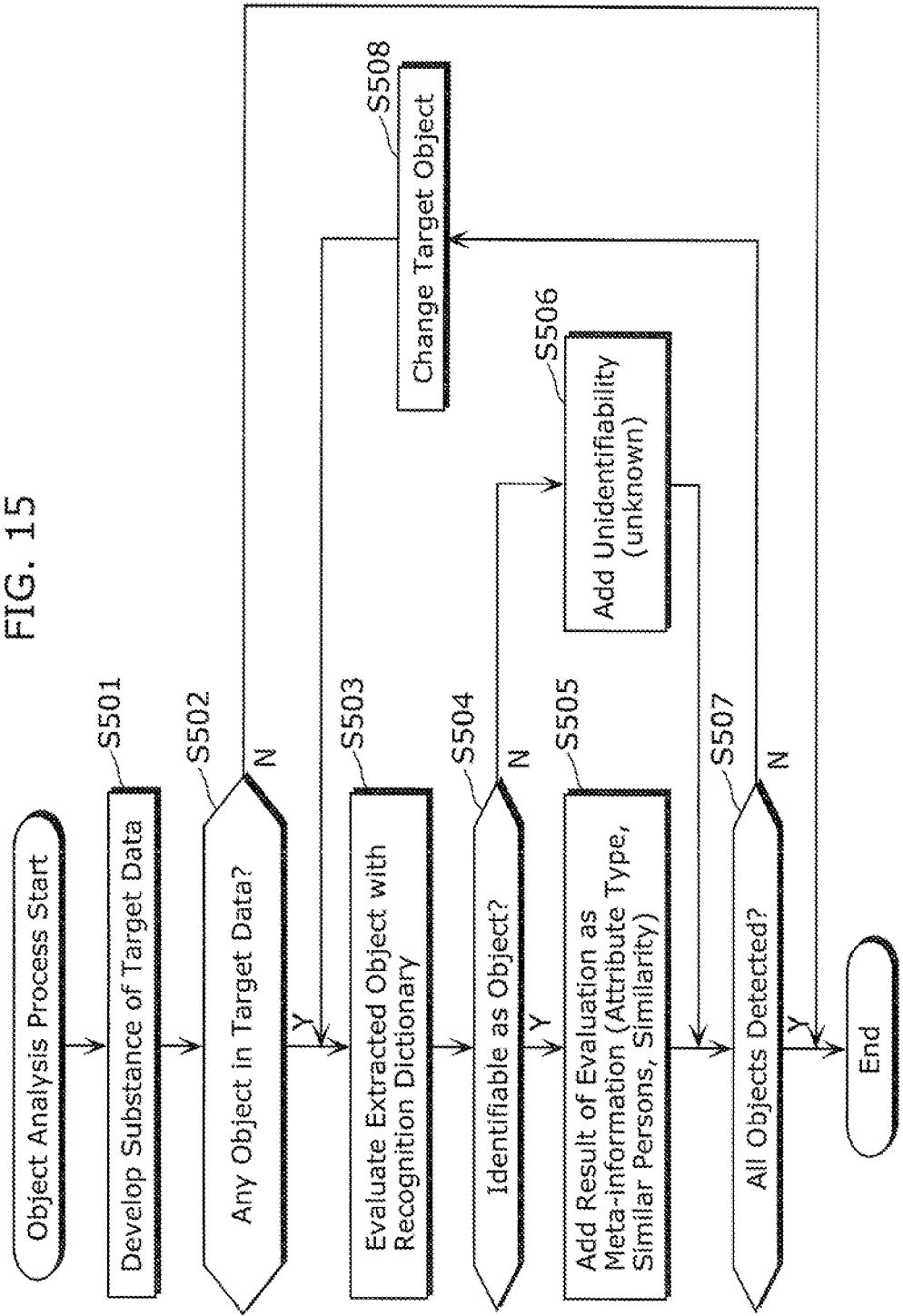
FIG. 15 is a flowchart showing a flow of object analyzing process according to Embodiment 2 of the present invention.

FIG. 15 is a flowchart showing a flow of object analyzing process in Embodiment 2 of the invention.

First, the data relation extraction unit 105 of the data processing apparatus 100A reads substance of target data accumulated by the data accumulation unit 102 for analysis at a certain time, such as when target data inputted via the input unit 101 is accumulated by the data accumulation unit 102, upon elapse of a predefined amount of time after accumulation, or at a predefined time every day. The data relation extraction unit 105 then instructs the object analysis unit 110 to analyze objects and the object analysis unit 110 internally develops the read-in data (S501).

If it determines that no object is present in the developed target data (N at S502), the object analysis unit 110 ends the object analyzing process. On the other hand, when it determines that an object is present in the target data (Y at S502), the object analysis unit 110 evaluates similar categories to which the extracted object belongs and the like with the recognition dictionary (S503).

The object analysis unit 110 further determines whether or not a result of evaluation has been obtained that the object can be identified as an object such as a particular person registered in the recognition dictionary (S504). If it determines that a result of evaluation that the object is identifiable is obtained (Y at S504), the object analysis unit 110 adds the result of evaluation (attribute type indicating whether the object is a person, the name of a particular person estimated to be similar, degree of similarity, and the like) to meta-information (S505).

On the other hand, if it determines that an evaluation result that the object is unidentifiable is obtained (N at S504), the object analysis unit 110 adds unidentifiability to meta-information (S506).

The object analysis unit 110 then determines whether all objects included in the developed target data have been detected or not (S507). If it determines that not all objects are detected yet (N at S507), the object analysis unit 110 changes the current object and repeats processing from step S503 (S508).

On the other hand, if it determines that all objects are detected (Y at S507), the object analysis unit 110 notifies the data relation extraction unit 105 of completion of object analysis process. The data relation extraction unit 105 repeats this process until there is no unprocessed target data.

Figure 16:
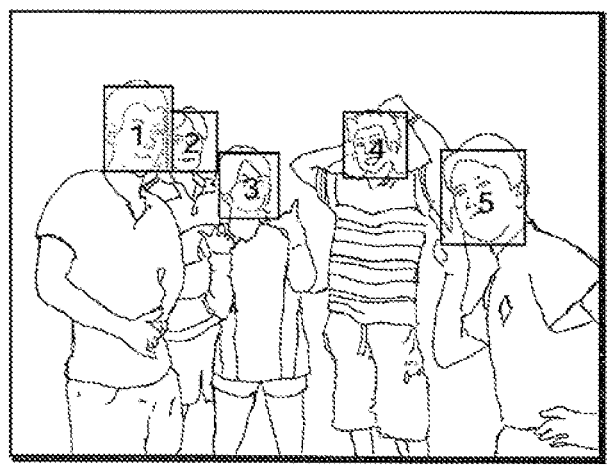
FIG. 16 is a diagram showing an image of content data according to Embodiment 2 of the present invention.

FIG. 16 shows how content data looks like in Embodiment 2 of the invention.

FIG. 17 is a diagram showing an example of priority levels determined from a result of object recognition and closeness in social information in Embodiment 2 of the invention.

As shown in FIG. 16, the object analysis unit 110 sequentially analyzes objects included in target data while assigning object IDs to the objects, and adds the result of recognition for objects included in each target data to meta-information as shown in FIG. 17(*a*).

Since no person is included for data name C-1 in this example, no object is registered for data name C-1. For data name C-2, "Mike" is determined to be similar from the recognition dictionary, so information including attribute type "human", a similar person "Mike", and a similarity of "98%" is added.

For data name C-3, among the five people as subjects included in the target data, object ID (MID) 1 has been recognized as "James" with a similarity of 71%, object ID 4 as "Kevin" with a similarity of 54%, and object ID 5 as "Mike" with a similarity of 88%. Object IDs 2 and 3 represent a case where no similar person can be identified with the recognition dictionary and "unknown" is added at step S506.

For data name C-4, "Alice" has been identified with a similarity of 47%. FIG. 17(*b*) is described later.

Figure 18:
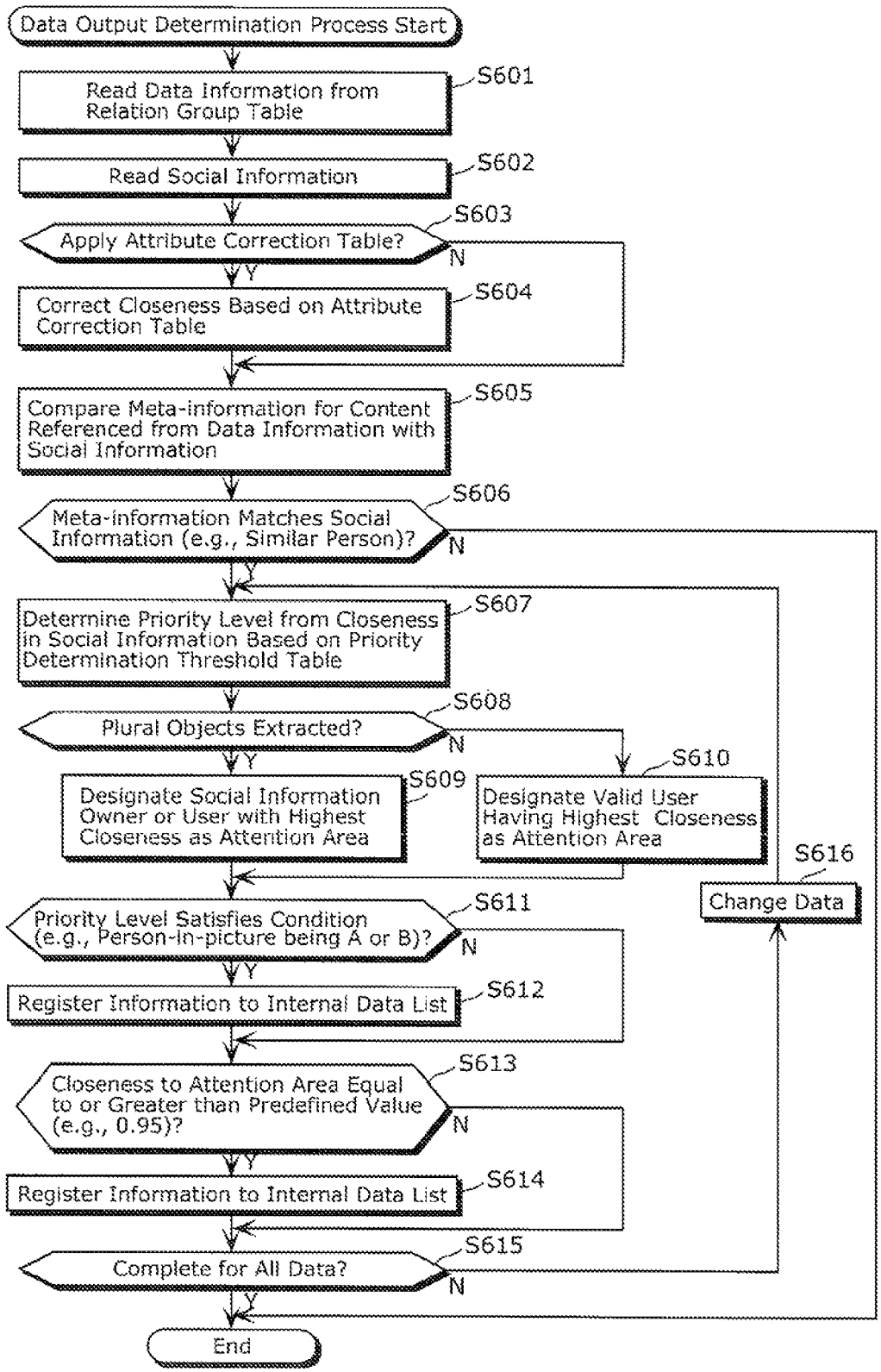
FIG. 18 is a flowchart showing a flow of a data output determination process according to Embodiment 2 of the present invention.

FIG. 18 is a flowchart showing a flow of a data output determination process in Embodiment 2 of the invention.

FIG. 19 is a diagram showing an example of an attribute correction table in Embodiment 2 of the invention.

Figure 21:
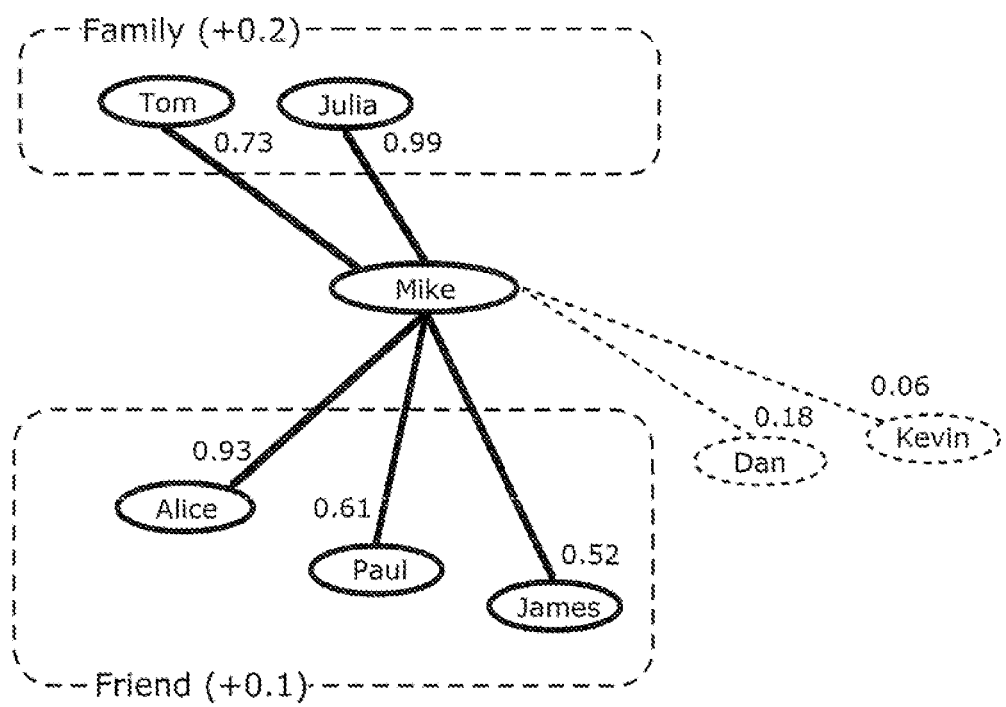
FIG. 21 is a diagram showing node concept for social information according to Embodiment 2 of the present invention.

FIG. 20 is a diagram showing an example of social information in Embodiment 2 of the invention.

as FIG. 21 is a diagram showing node concept for social information in Embodiment 2 of the invention.

FIG. 22 is a diagram showing an example of an internal data list in Embodiment 2 of the invention.

FIG. 23 is a diagram showing an example of a device attribute table in Embodiment 2 of the invention.

Figure 24A:
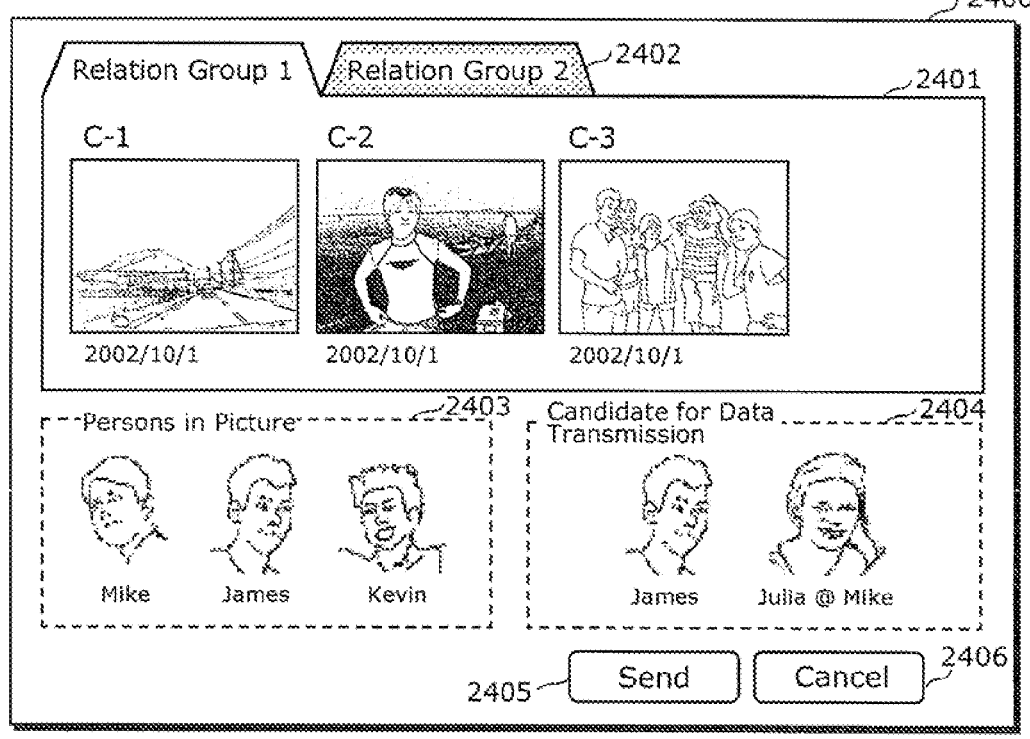
FIG. 24A is an illustration showing an example of screen output result according to Embodiment 2 of the present invention.
Figure 24B:
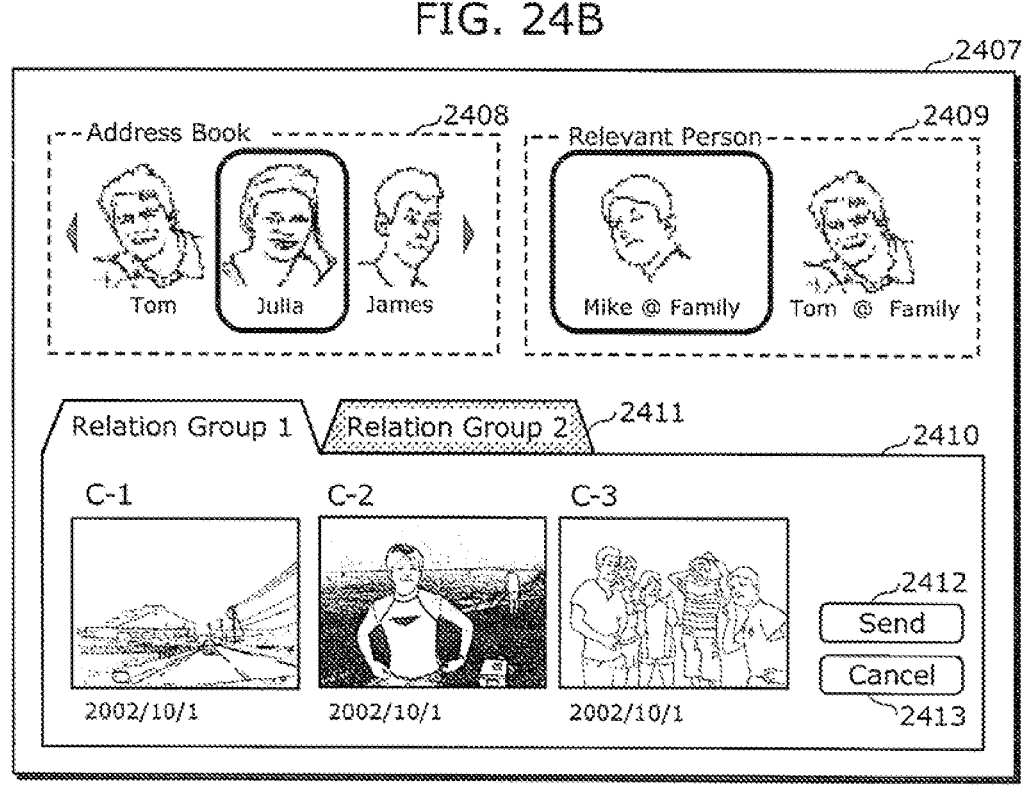
FIG. 24B is an illustration showing an example of screen output result according to Embodiment 2 of the present invention.

FIG. 24A and FIG. 24B are illustrations showing an example of screen output result in Embodiment 2 of the invention.

The flow of the data output determination process is described below using FIGS. 18 to 24B.

As shown in FIG. 18, in Embodiment 2, the data output determination unit 107 maintains an attribute correction table for correcting social information stored by the social information storage unit 106 based on its attribute information as shown in FIG. 19. It is assumed here that closeness is corrected by +0.20 for attribute "family" and +0.10 for attribute "friend".

In FIG. 20, attribute information is added to the social information shown in FIG. 3 of Embodiment 1. This attribute information can be modified and saved by directly specifying the relationship with a registered person by inclusion of a function to rewrite social information stored by the social information storage unit 106 as a "social information setting tool", for example, into various functions of the application unit 104 of the data processing apparatus 100A, for example. Alternatively, attribute information in social information stored by the social information storage unit 106 may be affected via the application unit 104 by placing a key holder that can portably carry social information over the input unit 101 of the data processing apparatus 100A.

In the following, details of processing by the data output determination unit 107 of the data processing apparatus 100A is described.

As shown in FIG. 18, the data output determination unit 107 reads data information from a relation group table outputted by the data relation extraction unit 105 (S601), and further reads social information stored by the social information storage unit 106 (S602).

The data output determination unit 107 then determines to whether to apply correction based on the attribute correction table or not. If correction should be applied (Y at S603), the data output determination unit 107 corrects closeness with reference to the attribute correction table (S604). On the other hand, if correction based on the attribute correction table is not applied (N at S603), the data output determination unit 107 skips step S604.

The processing result of correction based on the attribute correction table is described now using FIG. 20. It can be seen that the values of closeness shown in FIG. 20 have been corrected from the closeness values shown in FIG. 3 depending on attribute information in accordance with the attribute correction table shown in FIG. 19.

That is, closeness for "Julia" and "Tom" for whom attribute "family" is specified is increased by 0.20, and closeness for "Alice", "Paul", and "James" for whom attribute "friend" is specified is increased by 0.10. However, closeness is not corrected for "Dan" and "Kevin" for whom no attribute has been newly specified. FIG. 21 conceptually shows how user nodes originating from the social information owner "Mike" and their closeness are corrected with the attribute correction table.

Returning to FIG. 18, the data output determination unit 107 further compares meta-information for content data referenced from the data information to social information (S605), and determines whether or not the result of object analysis, such as similar persons, matches social information (S606). If it determines that the result of object analysis does not match social information (N at S606), the data output determination unit 107 ends the data output determination process.

On the other hand, if it determines that the result of object analysis matches social information (Y at S606), the data output determination unit 107 determines a priority level from closeness in social information by the priority determination threshold table (S607). That is, in FIG. 17, a priority level is assigned to each extracted object as shown in FIG. 17(b).

The data output determination unit 107 then determines whether plural extracted objects are included in the target data or not (S608). If it determines that plural extracted objects are included in the target data (Y at S608), the data output determination unit 107 designates the social information owner or a user having the highest closeness as attention area (S609).

On the other hand, if it determines that the number of extracted object included in the target data is not plural (N at S608), the data output determination unit 107 designates a user who is valid and has the highest closeness as attention area (S610).

Specifically, in FIG. 17, for data name C-2, "Mike", the social information owner, is given "1" in an attention field representing the attention area, and "Mike" is also given "1" in the attention field of data name C-3; whereas for data name C-4, "Alice", who is a user having the highest closeness, or priority level, is given "1" in the attention field.

Note that although the present description shows a method of determining the attention area using closeness, the method for attention area selection is not limited thereto: the largest extracted object in terms of area ratio or a person who has the highest similarity among ones extracted with the recognition dictionary may be selected.

The data output determination unit 107 then adds similar persons extracted in each relation group to the internal data list as "persons in picture", and determines whether or not each of the similar persons extracted with the recognition dictionary satisfies a predefined condition in terms of priority level (a person included as a photographic subject having a priority level of either A or B here) (i.e., whether his closeness is equal to or greater than a predetermined threshold or not) (S611).

If it determines that his priority level satisfies the predefined condition (Y at S611), the data output determination unit 107 registers his information in the internal data list as a "data provision candidate" (S612). On the other hand, if it determines that his priority level does not satisfy the predefined condition (N at S611), the data output determination unit 107 skips step S612.

The data output determination unit 107 further determines whether or not there is any user whose closeness with the attention area designated at step S609 and step S610 is equal to or greater than a predefined value (0.95 or greater herein) (S613). If it determines that there is a user having a closeness equal to or greater than the predefined value (Y at S613), the data output determination unit 107 registers the user to the internal data list as a "data provision candidate" so as to be related to the attention area (S614). On the other hand, if it determines that there is no user who has a closeness equal to or greater than the predefined value (N at S613), the data output determination unit 107 skips step S614.

The data output determination unit 107 then determines whether or not the data output determination process is complete for all data (S615). If it determines that determination is not complete (N at S615), the data output determination unit 107 changes the target data in the relation group (S616), and repeats processing from step S607. On the other hand, if it determines that determination is complete for all data (Y at S615), the data output determination unit 107 ends the data output determination process.

The data output determination unit 107 finally outputs an internal data list as shown in FIG. 22 by modifying the relation group table at steps S106 and S107 in FIG. 6 described above.

That is, users, "Mike", "James", and "Kevin", who are estimated to appear as subjects in C-1, C-2, and C-3 which belong to one relation group 1 are registered as persons in picture, and only "James", whose priority level is determined to be B, is chosen as a data provision candidate. In addition, from social information originating from "Mike" designated as the attention area, "Julia" whose closeness is greater than 0.95 is selected for a data provision candidate as a user related to the attention area.

Likewise, for C-4 which belongs to relation group 2, "Alice" is the only person in picture and also designated as the attention area. "Alice" has a priority level of A and is selected as a data provision candidate, but because social information originating from "Alice" is not stored, "Alice" is selected as a data provision candidate with priority level A. It is of course easy to imagine that if social information originating from "Alice" was stored, data provision candidates can be increased with any user extracted from the social information who has closeness equal to or greater than the predefined value.

Here, the data output determination unit 107 sends the internal data list outputted back to the application unit 104, causing the application unit 104 of the data processing apparatus 100A to transfer the latest content data accumulated by the data accumulation unit 102 to the external data processing apparatus 100B or the data processing apparatus 100C. At the time of transfer, the application unit 104 of the data processing apparatus 100A controls the destination of data transmission using the internal data list so that content in which a user having a close relationship is included as a subject can be chosen and sent to that user or to a user who is close to the user included as a subject from content data accumulated by the data accumulation unit 102.

Here, when the application unit 104 of the data processing apparatus 100A sends data to users specified as data provision candidates in the internal data list shown in FIG. 22 at step S108 in FIG. 6; it sends content data belonging to a relation group to the data processing apparatus 100B or the data processing apparatus 100C related to each of the data provision candidate users. For example, for relation group 1, data named C-1, C-2, and C-3 are sent as a set of relevant data to the data provision candidates, "James" and "Julia".

Selection of a set of relevant data depends on processing by the data relation extraction unit 105 and is described with date of shooting as an example in this embodiment. The criterion for extracting relationship is not limited to date of shooting, however. Data may be organized into relation groups using an event as a unit when scene identification for content data by the object analysis unit 110 can identify content data as "athletic meet" or "travel".

FIG. 23 is a diagram showing an example of a device attribute table in Embodiment 2 of the invention.

Specifically, FIG. 23(a) represents a device attribute table which is stored by the social information storage unit 106 as information relevant to social information, in which functional attributes of each device can be referenced by device ID, device type represented by a general name, and various functional attributes (image-taking and data reception functions here). FIG. 23(b) represents an example where a user owning each device (the device owner) identified by reference to social information is indicated by mapping to a device ID.

When data is to be sent to user "James", the data processing apparatus 100B owned by the user "James" has device ID "DSC-Y", which is a digital still camera capable of image taking but not having data receiving functions. Thus, depending on the ability of the data processing apparatus 100B, data transmission may not be possible.

In such a case, it is determined in advance whether data transmission is possible or not based on a device attribute table such as shown in FIG. 23. If the other party's device is not capable of data reception, data transmission is completed by finding different information that can be referenced in social information (in this example, content data is sent as an attachment to an e-mail message to address "james@yyy.com" shown in FIG. 20).

When the user "Alice" has a digital still camera (device ID "DSC-Z") that cannot receive data and a home server (device ID "HS-A") that cannot take pictures but can receive data, one of the devices that is more suitable for data transmission in terms of ability is chosen to complete transmission.

FIGS. 24A and 24B are illustrations showing examples of screen output result in Embodiment 2 of the invention.

Although the above description showed a case where the data processing apparatus 100A automatically selects even destination devices as data provision candidates and carries out transmission, the application unit 104 may be controlled to display a screen 2400 on the output unit 108 as shown in FIG. 24A.

In a preview area 2401, images for selected image data for the relation group 1 are displayed in a list, and a preview area selection tab 2402 is present as selection means for viewing images for image data in relation group 2 which is now invisible. In a persons-in-picture introduction area 2403, persons included in the selected image data for relation group 1 based on the internal data list shown in FIG. 22 are displayed using user icons (or alternatively avatars representing users or the like). In a data transmission candidate display area 2404, users to whom data is now scheduled be sent are displayed using user icons (or avatars or the like).

After visually checking the contents of data to be transmitted and data transmission candidates, the user (or sender) commands pressing of a Send button 2405 via input means (such as touching, mouse operation, or voice input operation) of the input unit 101 to execute data transmission to the data transmission candidates.

Note that "Kevin" who did not satisfy the predefined condition described in this embodiment is not automatically chosen as a data transmission candidate. When the user wants to send data to "Kevin", however, the user can designate Kevin as a candidate to whom data will be sent simultaneously by moving Kevin's icon from the persons-in-picture introduction area 2403 on the screen 2400 into the data transmission candidate display area 2404 such as by drag-and-drop operations. When the user does not require data transmission process, the user can cancel data transmission process by pressing a Cancel button 2406.

FIG. 24B shows an example of a data-for-transmission selection screen according to another procedure in connection with the data transmission process using closeness in social information. In this case, based on an address book to manage persons to whom data can be sent, pieces of data which include a selected user as a subject or pieces of data that are derived by reverse lookup of users who have high closeness with a selected user and who are highly relevant or interested are displayed as a relation group for content data to be transmitted.

Specifically, on a screen 2407 of FIG. 24B, when "Julia" is chosen as a person to whom something should be sent in an address book display area 2408, "Mike" and "Tom" who are highly relevant to "Julia" who is the person selected for transmission, are displayed for reference in a relevant person display area 2409 by tracing "family" attribute in social information. When "Mike" is selected as the initial focus, images for image data of relation group 1 which relate to "Mike" are displayed in a list in a preview area 2410, and a preview area selection tab 2411 is also displayed for displaying images for image data of relation group 2.

The user (or sender) visually checks contents of data for transmission and then presses a Send button 2412 to execute data transmission to the data transmission candidate "Julia". When the user does not require data transmission process, the user can cancel is the data transmission process by pressing a Cancel button 2413.

With this configuration, the relationship between a user associated with an object included in data of interest and a user as a data provision candidate is determined using closeness between the users represented in corresponding social information. This enables control in a manner that, when data of interest includes a particular facial object, for example, a user (grandparent, Julia) who is close to the particular person extracted (grandchild, Mike) is selected as a candidate for transmission. Thus, the data can be sent to a grandparent as a close user even when facial objects for the grandparent are not included in the data without imposing an operational burden on the user in specifying transmission to the grandparent.

In addition, whether data should be provided or not is determined per relation group extracted even when a particular facial object is not included in the data of interest. Thus, photograph data taken before and after taking a photograph containing a face, such as a scenic picture taken during a travel, can be provided together, and photograph data including context of an event that cannot be conveyed only by photograph data including a particular facial object can be sent together.

In addition, such control is possible to send content data whose data provision has been permitted based on the result of determination by the data output determination unit 107 to the data processing apparatus 100B or the data processing apparatus 100C, which are external apparatuses.

The present description uses priority levels of A and B and a closeness value of 0.95 or greater with respect to a photographic subject as conditions for selecting data provision candidates. The conditions for selection are not limited to them, however, and any user who is estimated to be a subject may be selected as a data provision candidate or other measures may be used.

In addition, although the present description assumes that "Mike" is the only social information owner for simplifying description, realization means is not limited thereto. It is also possible to adopt a scheme which selects data provision candidates for plural social information owners, or a scheme which selects users, from among users who are common to plural social information owners, who have a closeness exceeding a predefined priority level, or a user whose total closeness calculated from plural social information owners exceeds a predefined priority level for data provision candidates.

In addition, although the present description counts any user who appears even once as a person-in-picture in the internal data list shown in FIG. 22, how to count persons in picture is not limited thereto. An object included in data of interest for a relation group may be counted as an object-in-picture (or a person-in-picture) only when the object appears a predefined number of times or more, or a user whose closeness in social information is equal to or greater than a predefined condition (e.g., 0.30 or higher) may be counted as a person in picture. Further, such a scheme is also possible that selects a user as a data provision candidate whose frequency of appearance satisfies a predefined condition in the relation group for a certain event (e.g., appearing in 50% or more of all images of the relation group) even when the user's current closeness is low.

In addition, although the present description uses an example where image data is directly sent to a device owned by a user to whom the data should be sent as means for data sharing with close persons, the means for data sharing is not limited thereto. It is also possible to employ a scheme in which the data processing apparatus posts image data to be shared at an external location for viewing in response to an external request while maintaining the image data (a Web server approach) and only information on the data location (URL or Uniform Resource Locator) is transmitted, or image data may be once uploaded to an external service, such as a SNS (Social Networking Service) or a photo sharing service, and information on the data location or invitation to the service (such as a URL or login information) may be transmitted.

Embodiment 3

Figure 25:
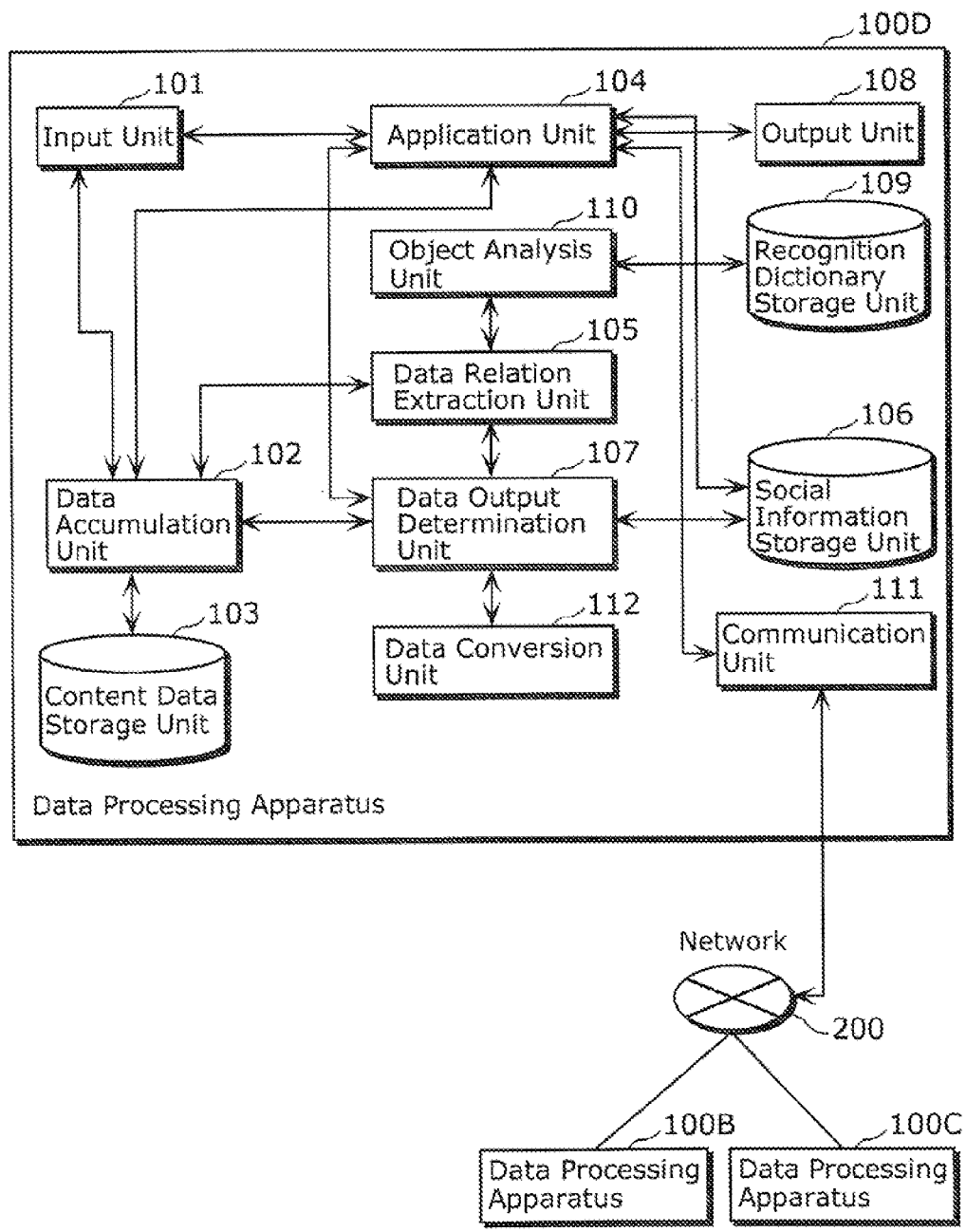
FIG. 25 is a block diagram showing a configuration of a data processing apparatus according to Embodiment 3 of the present invention.

FIG. 25 is a block diagram showing a configuration of a data processing apparatus 100D according to Embodiment 3 of the invention. In FIG. 25, the same reference numerals are used for the same components as in FIGS. 1 and 11, and their descriptions are omitted.

In FIG. 25, the data processing apparatus 100D has a data conversion unit 112 in addition to the components of FIG. 11 (the configuration of Embodiment 3).

The data processing apparatus 100D of Embodiment 3 is a video recorder or home server into which an external storage medium with image data stored therein can be inserted and which can accumulate plural pieces of image data that have been read in, a digital still or video camera that is capable of taking and accumulating plural still or moving images, or the like, for example.

Figure 26:
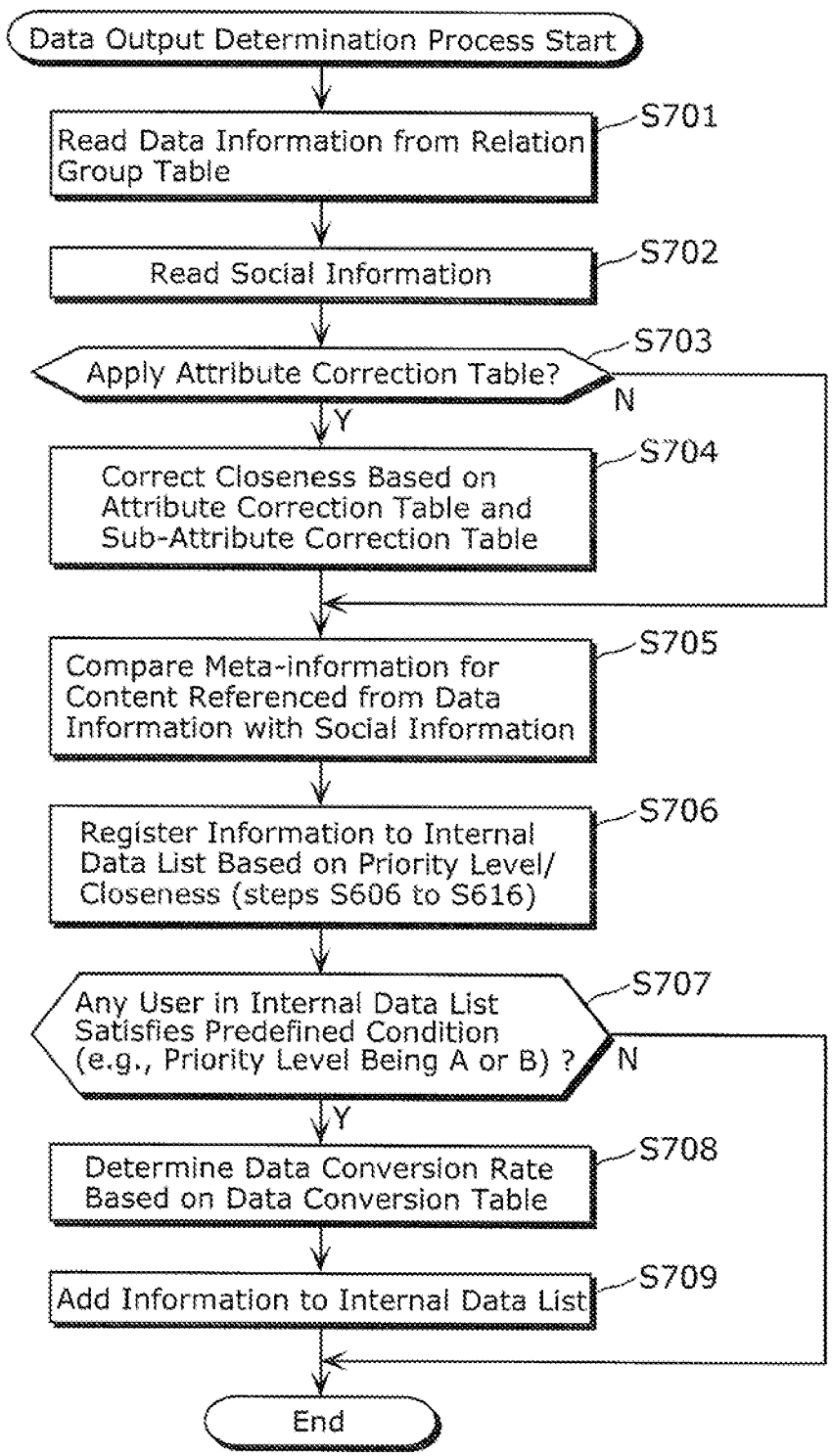
FIG. 26 is a flowchart showing a flow of a data output determination process according to Embodiment 1 of the present as invention.

FIG. 26 is a flowchart showing a flow of a data output determination process in Embodiment 3 of the invention.

FIGS. 27A and 27B are diagrams showing examples of a sub-attribute correction table in Embodiment 3 of the invention.

FIG. 28 is a diagram showing an example of social information to in Embodiment 3 of the invention.

FIG. 29 is a diagram showing an example of an internal data list for a data output determination process in Embodiment 3 of the invention.

FIGS. 30A and 30B are diagrams showing examples of a data conversion table in Embodiment 3 of the invention.

FIG. 31 is a diagram showing an example of data output result in Embodiment 3 of the invention.

The flow of processing is described below using FIGS. 25 through 31.

The data conversion unit 112 shown in FIG. 25 converts content data into a given format. Specifically, the data conversion unit 112 serves to convert or modify data to be outputted in accordance with an instruction in the internal data list outputted by the data output determination unit 107.

The data output determination unit 107 determines to output content data after conversion at the data conversion unit 112 in accordance with closeness.

Further, the application unit 104 has functions as a data output unit to output content data converted by the data conversion unit 112 depending on the result of determination by the data output determination unit 107.

This embodiment imagines a case where the application unit 104 of the data processing apparatus 100D transfers the latest content data accumulated by the data accumulation unit 102 to the external data processing apparatus 100B or the data processing apparatus 100C as in Embodiment 2. The following description shows data processing for changing the size of data to be transferred according to closeness with the user to whom the data is transferred when selecting and transferring content data which includes a close user as a subject to that user or to a user who is close to the user included in the data as a subject from the latest content data accumulated by the data accumulation unit 102.

As shown in FIG. 26, steps S701 through S703 of the data output determination process by the data output determination unit 107 are the same as steps S601 through S603 shown in FIG. 18, so their descriptions are omitted.

Then at step S704, the data output determination unit 107 corrects social information stored by the social information storage unit 106 using the sub-attribute correction table shown in FIGS. 27A and 27B in addition to the attribute correction table described at step S604.

Here, each user's closeness is corrected based on sub-attribute information in addition to attribute information for that user as shown in FIG. 28. For example, for the user "Tom", sub-attribute information "parent" is designated in addition to attribute "family" with respect to the social information owner, "Mike". Accordingly, in accordance with the sub-attribute correction table of FIG. 27A, his previous closeness "0.73" (see FIG. 20) has been corrected by +0.10 as to "0.83". Likewise, for the user "Alice", "school" is specified as sub-attribute information, so her closeness is corrected by +0.05 to "0.99" as shown in FIG. 27B (the maximum value of closeness is assumed to be 0.99 here as with the user "Julia").

Following step S705 and S706 are the same as steps S605 to S616 shown in FIG. 18. Here, because closeness in the internal data list outputted by the data output determination unit 107 of Embodiment 3 has been corrected according to sub-attributes at step S704, the user "Tom (Mike's father)" whose closeness level has been to changed to A as a user relevant to the attention area "Mike" for relation group 1 has been newly registered as a data provision candidate as shown in FIG. 29.

Further, the data output determination unit 107 of Embodiment 3 determines here whether or not any of data provision candidate users in the internal data list satisfies a predefined condition (e.g., priority level being A or B) (S707).

If it determines that the predefined condition is satisfied (Y at S707), the data output determination unit 107 determines a data conversion rate for the content data to be outputted based on a data conversion table such as shown in FIGS. 30A and 30B (S708), and adds information to the internal data list (S709).

On the other hand, if it determines that the predefined condition is not satisfied (N at S707), the data output determination unit 107 ends the data output determination process. Here, FIG. 30A is a diagram for changing the data conversion rate based on a priority level, and FIG. 30B is a diagram for changing the data conversion rate in consideration of sub-attribute information in addition to the priority level.

By way of example, as shown in FIG. 31, data conversion rate is 50% for the user "James", who has priority level B and has no sub-attribute information, data conversion rate is 150% for the user "Julia", who has priority level A and sub-attribute information "grandmother", data conversion rate is 75% for the user "Tom", who has priority level A and sub-attribute information "parent", and data conversion rate is 100% for user "Alice", who has priority level A, sub-attribute information "school" and has no attribute information that can be referenced in the data conversion table.

The data conversion unit 112 of the data processing apparatus 100D of Embodiment 3 then converts the size and the like of data to be outputted to each user in accordance with an instruction on data conversion rate in the internal data list outputted by the data output determination unit 107 in the process of executing a processing queue shown at step S108 of FIG. 6. The application unit 104 of the data processing apparatus 100D subsequently transfers the data converted by the data conversion unit 112 to the corresponding user.

Note that although the present description mentions that a conversion rate for data is determined using priority levels that are established with a certain granularity or a data conversion rate referenced from sub-attribute information as shown in FIG. 30A and FIG. 30B, the basis for determining data conversion rate is not limited thereto. The data conversion rate may be determined based on profiles of a user as a candidate for provision (e.g., age, sex, area of living, handicap information, features of his/her device, such as screen size and communication functions).

In addition, the present description shows an example where the data output determination unit 107 of the data processing apparatus 100D converts data applying a fixed data conversion rate for all data transmission candidates presented in a relation group list outputted by the data relation extraction unit 105 as shown in FIG. 31. However, the procedure of data conversion is not limited thereto. For example, when sub-attribute information "grandfather/grandmother" as a profile of users mentioned above generally means that they have poor eyesight and they prefer image data including large faces to one including small faces, only images with larger faces may be selected in advance based on contents of data analyzed by the object analysis unit 110 of the data processing apparatus 100D. Alternatively, a variable and dynamic data conversion rate may be adopted, e.g., when image data selected for a send data candidate includes a small face, the data may be converted so as to enlarge the image with the area including the face zoomed.

In addition, the present description mentions that the size or resolution of each data item of target data is converted, or conversion like partial clipping is performed by applying zooming or the like using priority levels or a data conversion rate referenced from sub-attribute information. However, the way of converting data of interest is not limited thereto. At least one still image selected as data that should be provided is displayed being arranged in a single still image (i.e., at least one still image is laid out in sections of a single still image) so that the at least one data that should be originally provided may be converted to newly generate summary data.

In this case, the summary data newly generated by summarization may be converted as summary data that is common to at least one user as a candidate for provision to whom the summary data will be provided, but conversion to summary data is not limited to generation of only one piece of data. For example, for a stall image, at least one still image that satisfies a certain condition may be automatically selected with reference to closeness with a user as a candidate for provision or his profile and further in consideration of closeness with other users who are close to the user as the candidate for provision, and the still image may be converted such that at least one piece of summary data that is different from one provision candidate user to another is generated as a still image.

Additionally, the present description shows examples of data conversion on a still image as shown in FIGS. 30A, 30B, and 31, but such data is not limited to a still image. For example, when the data is a moving image, the image size or resolution of the entire image may be converted with a predetermined data conversion rate, or the data may be converted such that a scene in which a facial area is identified with the recognition dictionary is preferentially left with a high image quality and the resolution and/or frame rate of the remaining scenes are reduced at a predetermined data compression rate. Alternatively, conversion may be performed such that only scenes in which a facial region satisfying a certain condition appears are reconstituted into a digest, from which summary data may be generated.

The summary data generated as a moving image may of course be summary data common to users who are candidates for provision. However, at least one scene in the moving image that satisfies a certain condition may be automatically selected with reference to closeness with a user as a candidate for provision or his profile and further in consideration of closeness with other users who are close to the user as the candidate for provision, and conversion may be carried out such that at least one piece of summary data that differs from one provision candidate user to another is generated as a moving image.

In doing so, the data processing apparatus 100D may also provide summary data that is suited for a user's interest and taste with reference to profiles of the user as a candidate for provision. For example, it is preferable that summary data permit customization of contents included in the summary data (e.g., primary subjects, the order of included scenes) and/or decoration effects (such as display of a map or a landmark name to describe a situation), such as excerption of only a gist of the data (e.g., a digest of grandchild's good performance), provision of a general outline (e.g., the atmosphere at a wedding or overview of a travel), rendering temporal change of a complex element from the viewpoint of the target user himself (e.g., a record of growth of a cousin since the last meeting or an account of a friend's travel), or rendering with a presentation effect suited for the target user's taste (e.g., a template of his taste, such as a news-style template, displaying characters or expression in a larger size, a slide show changing at a low speed).

In addition, the data processing apparatus 100D may also form group information in consideration of relationship between other users in addition to closeness of the provision candidate user and generate at least one summary data in advance based on information about the data of interest and the group information. This enables the user to manage and control viewing of the at least one summary data by the group information.

The data processing apparatus 100D thus can generate beforehand first summary data intended for users such as family and relatives, second summary data intended for users such as close friends, and third summary data intended for users with whom the user has a relatively formal relationship (e.g., bosses, colleagues and/or juniors at the office or members of a club), for example. In this case, the first summary data may include private contents, e.g., a grandchild's expressions or a scene inside a house. The second summary data may include content data that was generated during experience of a common event, such as a home party or a travel, and that should be shared. The third summary data may include contents that mainly treat an event which may be opened and does not include private contents such as pictures of family or close friends.

As a result, the data processing apparatus 100D can provide summary data appropriate for group information that includes a user of interest from plural pieces of summary data thus generated in advance for individual provision candidate users.

With this configuration, how to select data and the data conversion rate are changed in accordance with closeness and profile of a provision candidate user. This enables such control to select or convert data so that a picture in which a grandchild's face is large is chosen for grandparents who have a high closeness and poor eyesight, and to convert data into a small image for transmission to a less close person just for a notice, for example. This allows appropriate data to be converted into an appropriate format and sent to close users without imposing an operational burden on the user for specifying selection and conversion of data specifically to the relationship with or characteristics of a person to whom data is sent.

Embodiment 4

Figure 32:
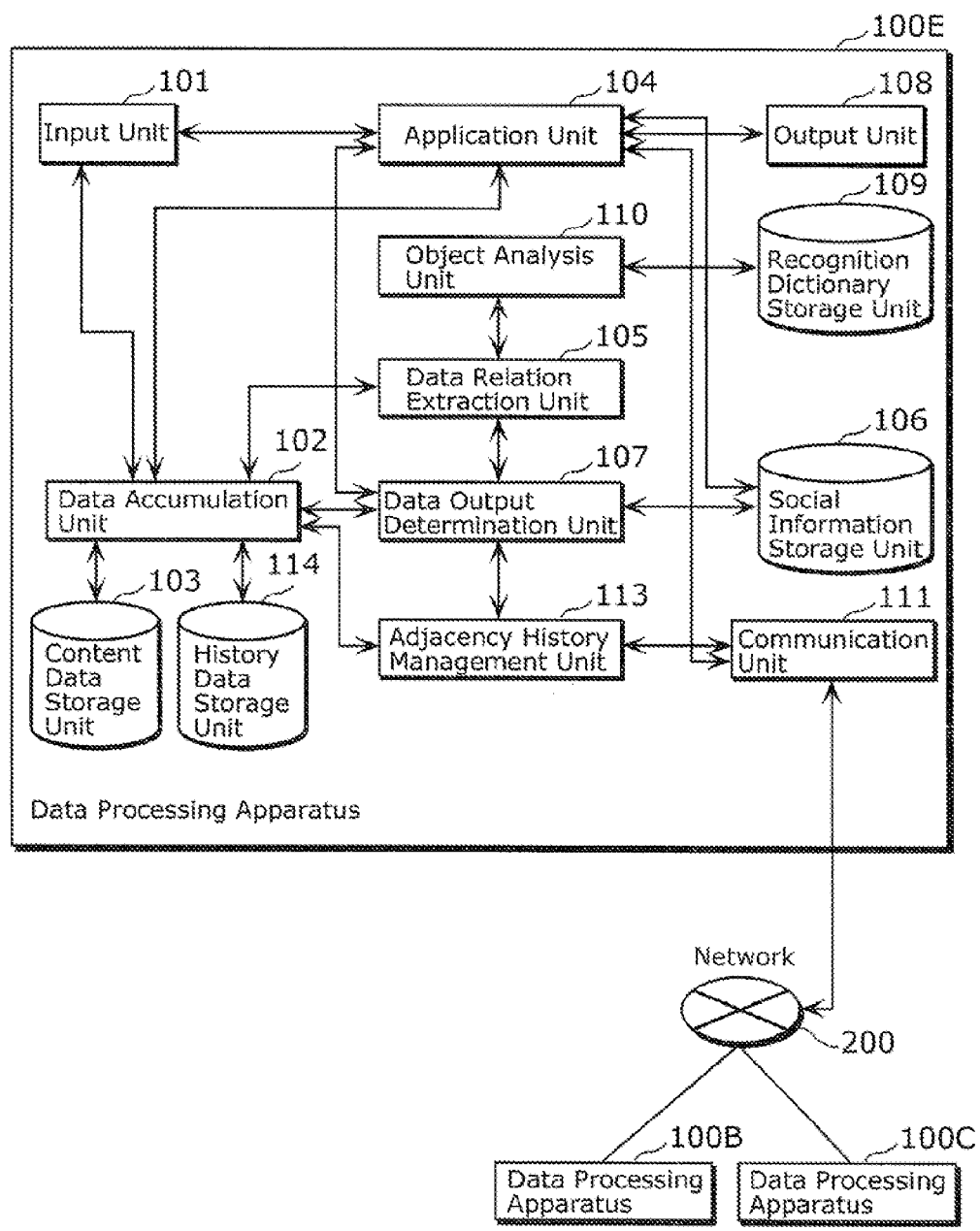
FIG. 32 is a block diagram showing a configuration of a data processing apparatus according to Embodiment 4 of the present invention.

FIG. 32 is a block diagram showing a configuration of a data processing apparatus 100E according to Embodiment 4 of the invention. In FIG. 32, the same reference numerals are used for the same components as in FIGS. 1 and 11, and their descriptions are omitted.

In FIG. 32, the data processing apparatus 100E has an adjacency history management unit 113 and a history data storage unit 114 in addition to the components of FIG. 11 (the configuration of Embodiment 4).

The data processing apparatus 100E of Embodiment 4 is a video recorder or home server into which an external storage medium with image data stored therein can be inserted and which can accumulate plural pieces of image data that have been read in, a digital still or video camera that is capable of taking and accumulating plural still or moving images, or the like, for example.

FIG. 33 is a diagram showing exemplary accumulation of content data in Embodiment 4 of the invention.

FIG. 34 is a diagram showing an example of social information in Embodiment 4 of the invention.

Figure 35:
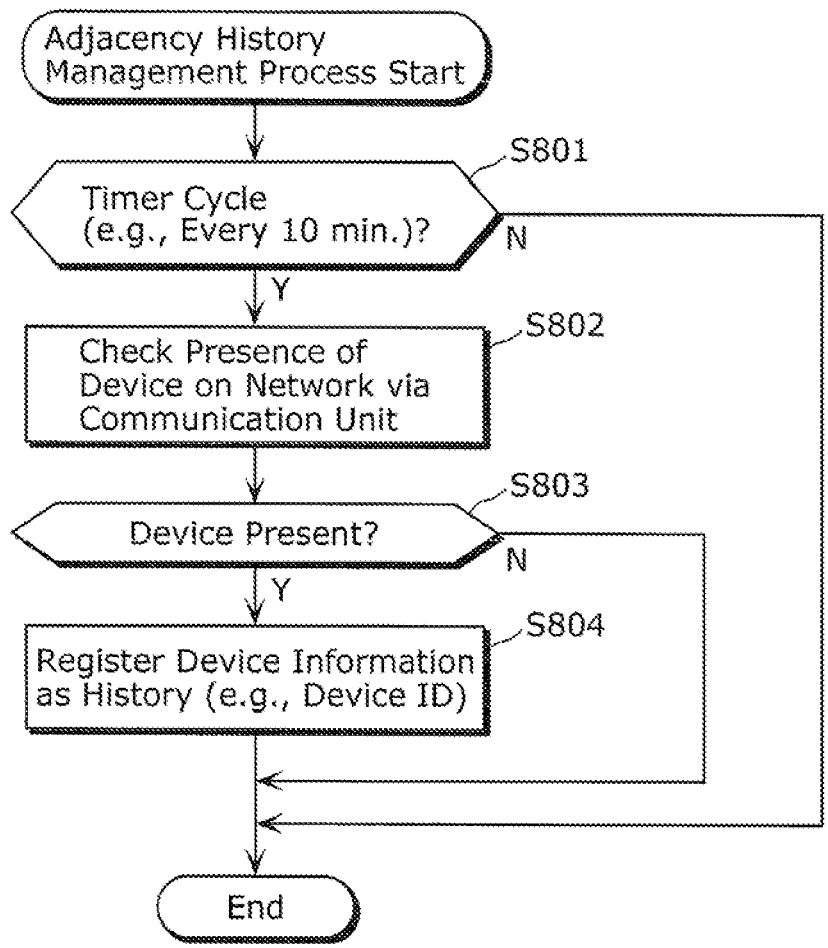
FIG. 35 is a flowchart showing a flow of an adjacency history management process according to Embodiment 4 of the present invention.

FIG. 35 is a flowchart showing a flow of an adjacency history management process in Embodiment 4 of the invention.

FIG. 36 is a diagram showing an example of adjacency history information in Embodiment 4 of the invention.

Figure 37:
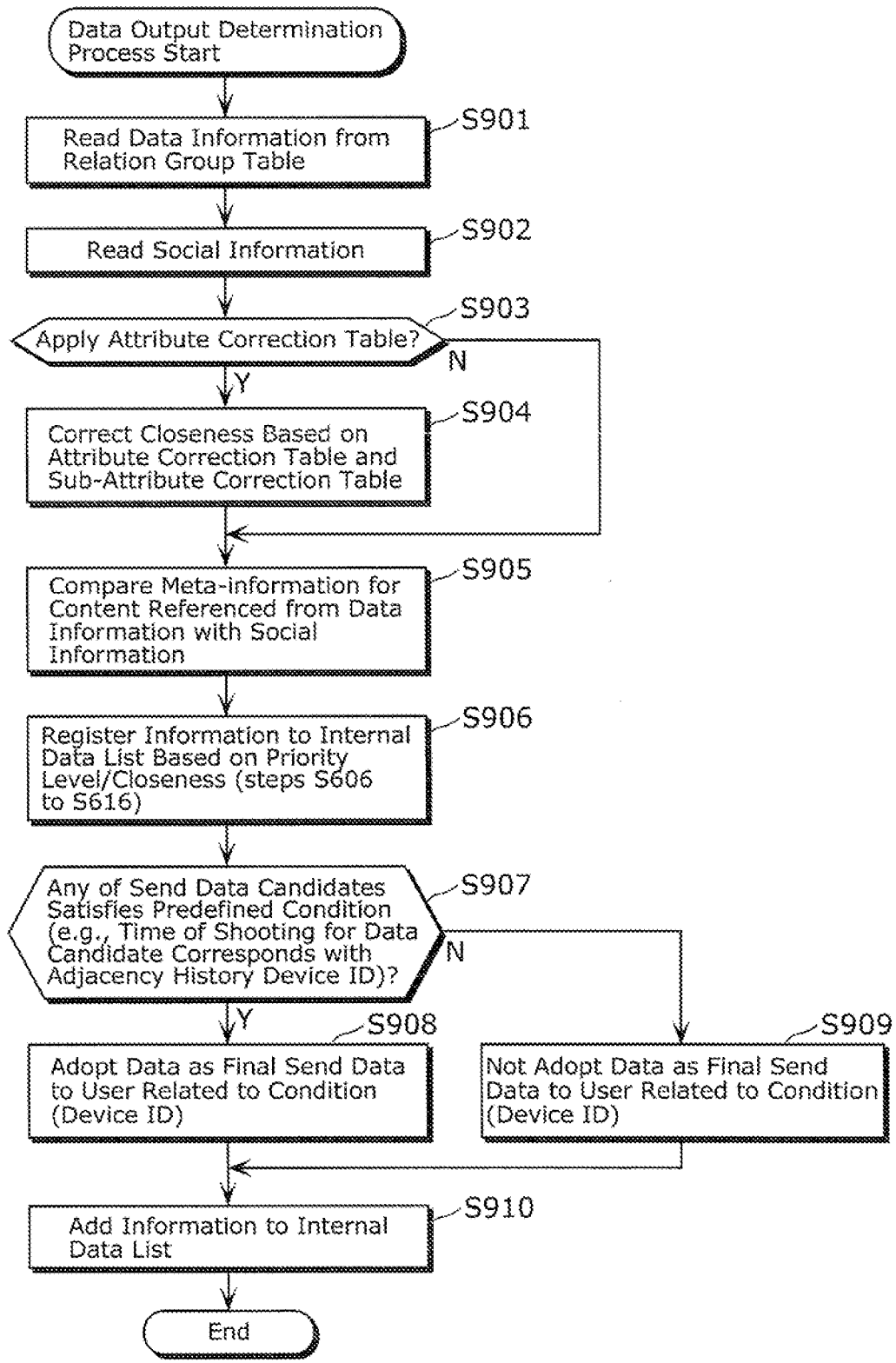
FIG. 37 is a flowchart showing a flow of a data output determination process according to Embodiment 4 of the present invention.

FIG. 37 is a flowchart showing a flow of a data output determination process in Embodiment 4 of the invention.

FIG. 38 is a diagram showing an example of shooting time slot distribution in Embodiment 4 of the invention.

The flow of processing is described below using FIGS. 32 through 38.

The history management unit 113 shown in FIG. 32 acquires history of short range communication with the data processing apparatus 100B or the data processing apparatus 100C, which are external apparatuses, performed via the communication unit 111 as adjacency history information.

The data output determination unit 107 determines that content data is outputted to an external apparatus that performed short range communication indicated in adjacency history information and that corresponds to a user having a closeness equal to or greater than a predetermined threshold, among users who are associated by social information. The predetermined threshold is 0.5, for example, when closeness assumes a value from 0 to 1.

The history data storage unit 114 is a memory storing adjacency history information.

Note that the adjacency history management unit 113 is contained in the data processing apparatus 100E as well as in the data processing apparatus 100B and the data processing apparatus 100C, which are connected by the network 200 via the communication unit 111. Here, for the network 200, a case is assumed where the data processing apparatuses 100E, 100B, and 100C communicate with each other through short-range radio communication that constitutes a local, ad-hoc communication network. The adjacency history management unit 113 in each of the data processing apparatuses 100E, 100B, and 100C manages each other's presence as adjacency history information, and the application unit 104 of the data processing apparatus 100E subsequently transfers content data accumulated by the data accumulation unit 102 to the external data processing apparatus 100B or the data processing apparatus 100C.

The following description shows data processing for determining which data to transfer according to adjacency history data, which is history information on adjacency with a device owned by a user to whom data is transferred, in addition to closeness with the user, at the time of transfer.

As shown in FIG. 33, Embodiment 4 assumes that the data accumulation unit 102 has accumulated ten still pictures taken with device ID "DSC-X" as the latest content data. It is assumed here that relation groups extracted by the data relation extraction unit 105 of the data processing apparatus 100E are grouped into C-1 through C-8 according to date of shooting for simplifying description.

Also, as shown in FIG. 34, Embodiment 4 assumes that closeness with the user "Mike" as the social information owner is established and the address and/or owned-device ID of each user are registered in advance.

Next, processing performed by the adjacency history management unit 113 is described.

As shown in FIG. 35, the adjacency history management unit 113 of the data processing apparatus 100E according to Embodiment 4 first checks a given timer cycle, e.g., ten minutes (S801).

If the time of check coincides with the timer cycle (Y at S801), the adjacency history management unit 113 sends an instruction for requesting verification of presence to an external data processing apparatus (the data processing apparatus 100B or the data processing apparatus 100C here) which is connected by the network 200 via the communication unit 111, and verifies the presence of a device on the network 200 with a response from the device (S802).

The history management unit 113 then determines whether any device is present on the network 200 (S803). If it determines that a device is present on the network 200 (Y at S803), the adjacency history management unit 113 instructs the data accumulation unit 102 to register the device ID of the device as device information in the history data storage unit 114 as adjacency history data (S804), for example.

On the other hand, when the time of check does not coincide with the timer cycle at step S801 or when no device is present at step S803, the adjacency history management unit 113 ends processing (N at S801 and N at S803).

FIG. 36 shows an example of adjacency history data registered by the adjacency history management unit 113 at step S804.

Here, the row of the diagram represents time slots from 8 a.m. to 8 p.m. in increments of one hour in date-of-shooting information (Oct. 1, 2002 in this example) for accumulated content data, and the column represents the device IDs of devices that are detected in the time slots by the adjacency history management unit 113 of the data processing apparatus 100E.

Thus, a device ID with "●" indicated in the diagram means that the device was present near the data processing apparatus 100E in that time slot and is determined to have been adjacent by the adjacency history management unit 113. For example, device ID "DSC-Y" owned by user "James" was in the proximity of user "Mike", who has "DSC-X" which is the data processing apparatus 100E, from 9 a.m. to 4 p.m.

Likewise, users who are related by other device IDs were also present near the user "Mike" and are considered to have been adjacent from adjacency history data, but because device ID "DSC-V" is not registered in the social information shown in FIG. 34, the ID is expected to be the device ID of a device owned by a user unknown to the user "Mike".

Processing performed by the data output determination unit 107 is now described in detail using FIG. 37. As steps S901 through S906 are the same as processing by the data output determination unit 107 shown in FIG. 26, their descriptions are omitted.

The data output determination unit 107 of Embodiment 4 then determines whether or not any of send data candidates registered in the internal data list outputted by step S906 satisfies a predefined condition, e.g., whether any of shooting times for the send data candidates agrees with the time slot in which a device ID registered in adjacency history data outputted by the adjacency history management unit 113 is considered to have been adjacent (S907).

If it determines that there is a send data candidate that satisfies the predefined condition (Y at S907), the data output determination unit 107 adopts the candidate data as the final send data to the user related to the condition (device ID in this example) (S908). On the other hand, if it determines that there is no candidate that corresponds to adjacency history data, that is, that satisfies the predefined condition (N at S907), the data output determination unit 107 does not adopt the data as the final send data to the user related to the condition (S909).

The data output determination unit 107 then adds information to the internal data list according to the result of determination at step S908 or step S909 (S910).

The data processing apparatus 100E shown in FIG. 32 consequently adopts two users "James" and "Paul" who own devices for which the adjacency history management unit 113 has left history of adjacency out of five users, "Alice", "Julia", "Tom", "Paul", and "James", who are determined to have a priority level of A or B based on the closeness shown in FIG. 34 when executing a processing queue according to the internal data list outputted by the data output to determination unit 107 at step S108 of FIG. 6, and sends content data in accordance with the distribution of shooting time slots shown in FIG. 38 as an example (i.e., distribution of time slots in which content data was generated).

The example of FIG. 38 represents time slots from 8 a.m. to 8 p.m. on Oct. 1, 2002 in increments of one hour, showing distribution of contents generated in the individual time slots. Accordingly, to "James", content data C-1 to C-7 that were generated in time slots from 9 a.m. to 4 p.m. in which his device was adjacent are sent, and to "Paul", content data C-1 to C-3, and C-8 that were generated in time slot from 8 a.m. to 11 a.m. and from 4 p.m. to 7 p.m. in which his device was adjacent are sent. Device ID "DSC-V" which is not registered in social information is ignored in the course of execution of the processing queue, of course.

With this configuration, a time slot in which a device was adjacent is identified from adjacency history data which indicates device were positioned in each other's vicinity by performing local communication via a network, in addition to closeness between users represented by social information for relationship between a user associated with an object included in data of interest and a user as a candidate for provision. This enables identification of an acquaintance's device that was present nearby when the data of interest was generated during a travel, for example, allowing such as control to send only pictures taken in a time slot in which an acquaintance and the user were together to the acquaintance's device. This allows data corresponding to history of actual acts to be sent to close users without imposing an operational burden on the user selecting data that was generated in time slots in which they were together.

Here, "Kevin" who has device ID "DSC-K" is not chosen as a destination of data output because his closeness is 0.06 and has a low rating with priority level Z. However, Kevin's closeness may be increased on ground that he was near the data processing apparatus 100E owned by the social information owner "Mike", or "Kevin" may be chosen as a destination of data output and content data for a time slot in which they were together may be outputted to "Kevin" based on adjacency history data.

In addition, although the adjacency history management unit 113 acquires adjacency history data on a regular basis, e.g., ten minutes, with a periodic timer as described above, the way of managing adjacency history data is not limited thereto. Adjacency history data may be accumulated at any time, e.g., a certain timing specified by the user, only before and after power-up, or immediately after occurrence of an operation event such as picture taking, or upon receiving a notice of an operation event from a peripheral device via the network 200.

In addition, although the present description mentions that adjacency history data managed by the adjacency history management unit 113 is compiled being rounded to the unit of hour, the method for adjacency history data management is not limited thereto. Other methods may be employed, such as recording the time at which short range communication has switched between on-line and off-line for each device ID.

In addition, although the present description mentions that the device ID of a device owned by each user is registered in advance as social information, the method of managing owned-device ID is not limited thereto. Device information including device ID may be acquired from a device that performed communication using the address of a user of interest and the device is estimated to be owned by that user from the frequency and/or a total communication count, and the device ID may be registered in social information as an owned-device ID. At the time of registration, a numerical value indicating an estimated probability may be registered together.

In addition, although the present description uses an example where data is sent only based on the user who owns a device that was adjacent and the user's closeness, determination of whether to output data is not limited thereto. It is also possible to perform filtering with finer time slots specified for users whose device can be considered to have been adjacent while outputting data to all users having a high closeness.

Embodiment 5

Figure 39:
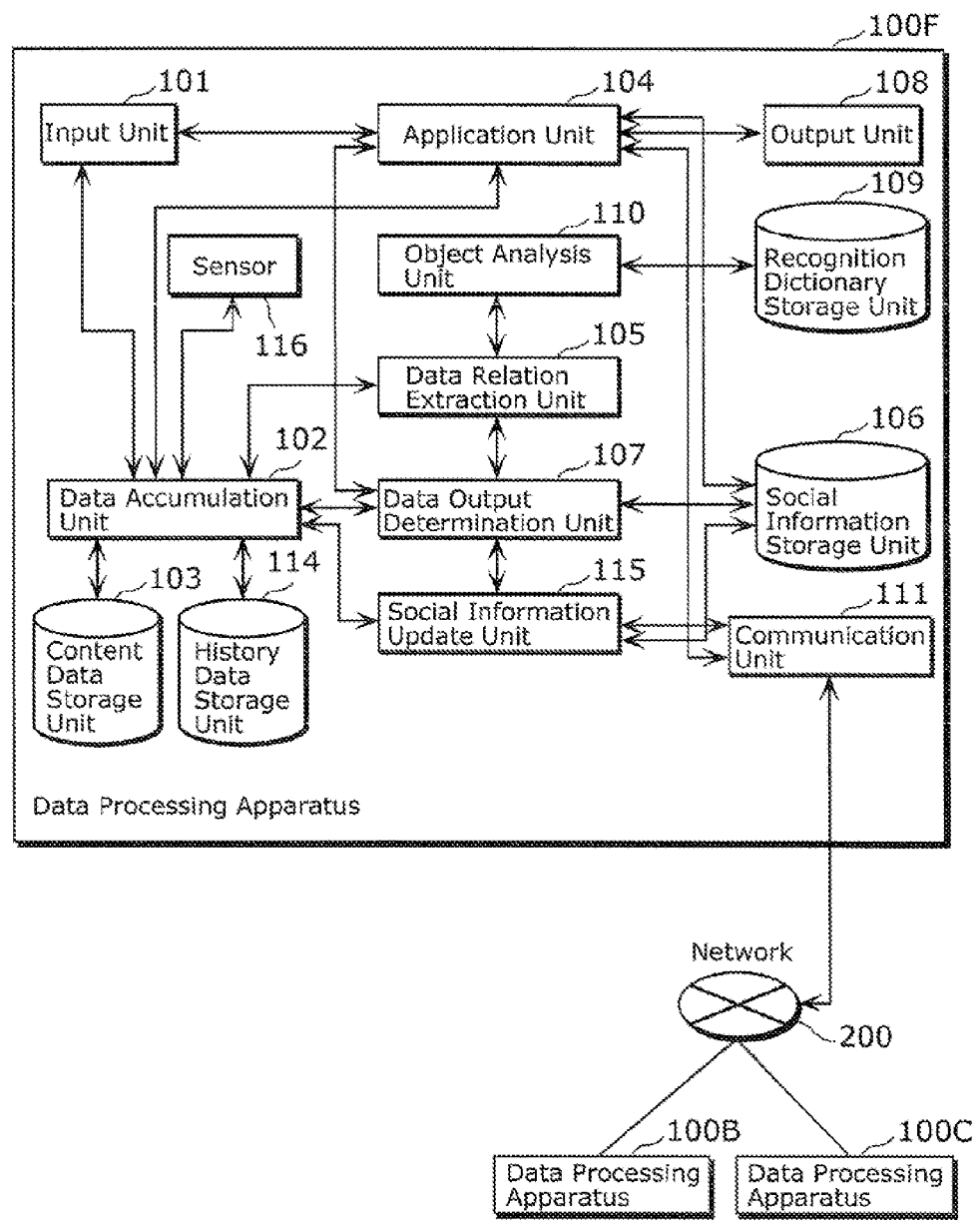
FIG. 39 is a block diagram showing a configuration of a data processing apparatus according to Embodiment 5 of the present invention.

FIG. 39 is a block diagram showing a configuration of a data processing apparatus 100F according to Embodiment 5 of the invention. In FIG. 39, the same reference numerals are used for the same components as in FIGS. 1 and 11, and their descriptions are omitted.

In FIG. 39, the data processing apparatus 100F has the history data storage unit 114, a social information update unit 115, and a sensor 116 in addition to the components of FIG. 11 (the configuration of Embodiment 5).

The data processing apparatus 100F according to Embodiment 5 is a video recorder or home server into which an external storage medium having image data stored therein can be inserted and which can accumulate plural pieces of image data that have been read in, a digital still or video camera that can take and accumulate plural still or as moving images, or the like, for example.

FIG. 40 is a diagram showing exemplary accumulation of content data in Embodiment 5 of the invention.

Figure 41:
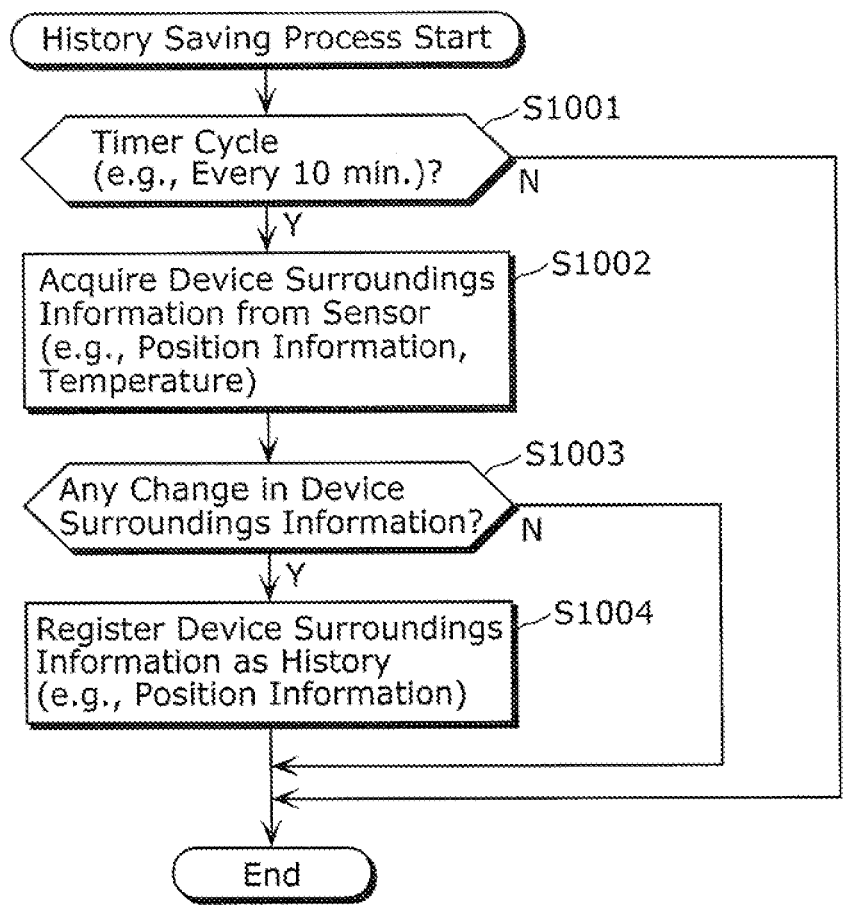
FIG. 41 is a flowchart showing a flow of a history saving process according to Embodiment 5 of the present invention.

FIG. 41 is a flowchart showing a flow of a history saving process in Embodiment 5 of the invention.

Figure 42:
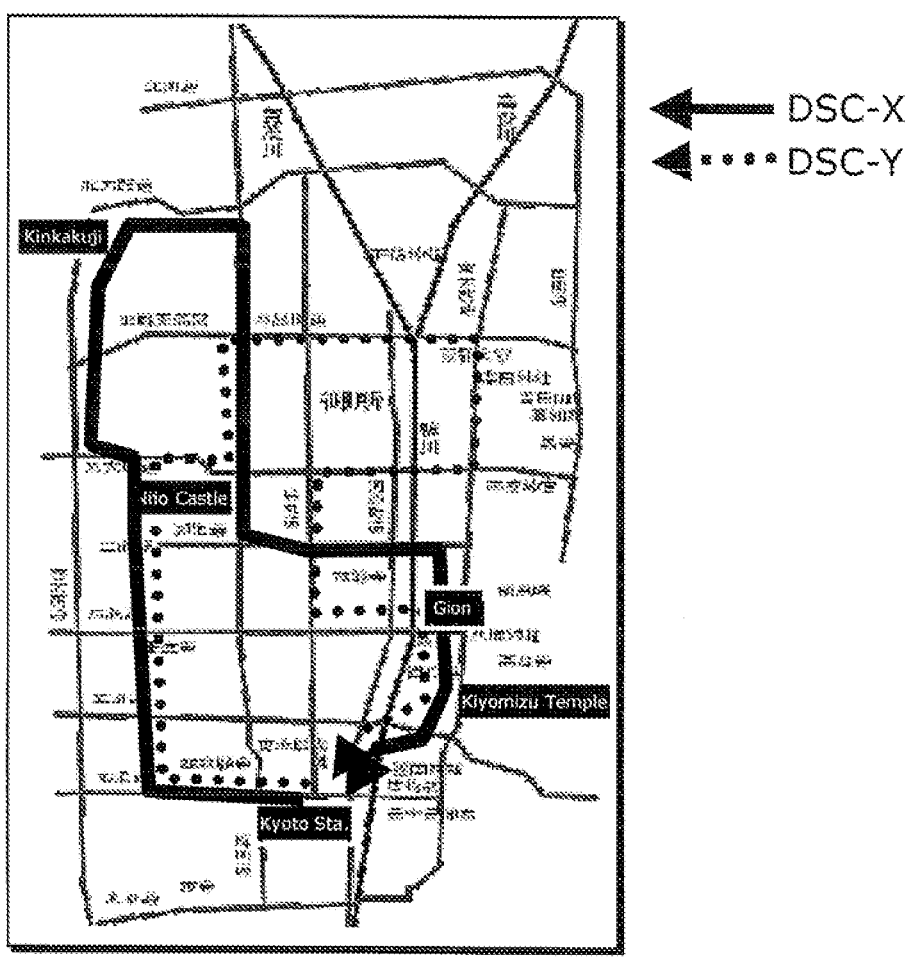
FIG. 42 is a diagram showing an example of movement of devices according to Embodiment 5 of the present invention.

FIG. 42 is a diagram showing an example of movement of devices in Embodiment 5 of the invention.

FIG. 43 is a diagram showing an example of position information history data for each device in Embodiment 5 of the invention.

FIG. 44 is a flowchart showing a flow of a data output determination process in Embodiment 5 of the invention.

FIGS. 45A and 45B are diagrams showing examples of social information update thresholds in Embodiment 5 of the invention.

FIG. 46 is a diagram showing an example of data output thresholds in Embodiment 5 of the invention.

FIG. 47 is a diagram showing an example of a result of calculating relative position information in Embodiment 5 of the invention.

The flow of processing is described below using FIGS. 39 through 47.

The social information update unit 115 shown in FIG. 39 makes reference to device surroundings information accumulated by the sensor 116 in the history data storage unit 114 as history data and updates social information stored by the social information storage as unit 106. Specifically, the social information update unit 115 acquires history data for surroundings information for the data processing apparatus 100B or the data processing apparatus 100C, which are external apparatuses, via the communication unit 111, and updates social information for the external apparatus with social information including the history data acquired.

The sensor 116 detects surroundings information indicating the position of the data processing apparatus 100F.

The data accumulation unit 102 accumulates history data resulting from detection by the sensor 116 in the history data storage unit 114.

The data output determination unit 107 determines whether to output content data or not using the latest social information updated by the social information update unit 115.

The application unit 104 of the data processing apparatus 100F then transfers content data accumulated by the data accumulation unit 102 to the external data processing apparatus 100B or the data processing apparatus 100C. The following description discusses data processing for determining which data to transfer by analyzing device surroundings information left by a device owned by a user of interest in addition to updated closeness of the user at the time of transfer.

As shown in FIG. 40, Embodiment 5 assumes that the data accumulation unit 102 has accumulated ten still pictures taken with device ID "DSC-X" as the latest content data.

It is assumed here that relation groups extracted by the data relation extraction unit 105 of the data processing apparatus 100F are grouped into C-1 to C-8 based on the date of shooting for simplifying description. Embodiment 5, however, assumes that information on location of shooting known as GPS (Global Positioning System) is included in each piece of data.

Also, as in FIG. 34 described earlier, Embodiment 5 also assumes that closeness is established with respect to the user "Mike" as the social information owner and each user's address and owned-device ID are registered in advance.

Processing performed by the social information update unit 115 is described next.

As shown in FIG. 41, the social information update unit 115 of the data processing apparatus 100F in Embodiment 5 first checks a certain regular timer cycle, e.g., ten minutes (S1001).

If the time of the check coincides with the timer cycle (Y at S1001), the social information update unit 115 acquires device surroundings information that can be obtained with the sensor 116, such as position information and temperature (S1002).

The social information update unit 115 then determines whether or not there has been any change in the device surroundings information acquired (S1003). If it determines that there has been some change in the device surroundings information (Y at S1003), the social information update unit 115 registers the position information for the device, for example, in the data accumulation unit 102 as history data (S1004).

On the other hand, if the time of check does not coincide with the timer cycle at step S1001 or it determines that there is no change in the device surroundings information at step S1003, the social information update unit 115 ends processing (N at S1001, N at S1003).

FIG. 42 shows an example of device movement on a map of a certain region in Embodiment 5. This map conceptually shows routes of device IDs "DSC-X" and "DSC-Y" followed: after departing Kyoto station, they were taken to Nijo Castle together, thereafter the device ID "DSC-X" was taken to Kinkakuji and device ID "DSC-Y" was taken from Nijo Castle to Gosho, then the two devices were joined together in Gion and taken back to Kyoto station by way of Kiyomizu Temple.

FIG. 43 shows an example of chronological plotting of position information for device ID "CM-P" as history data in addition to device IDs "DSC-X" and "DSC-Y" shown in FIG. 42. It is assumed here that position information is recorded when there is a significant change in to position information as device surroundings information in each time slot at step S1003 in FIG. 41. It is assumed here that the data processing apparatus 100F acquires history data accumulated in each device from the data processing apparatus 100B or the data processing apparatus 100C, which is connected by the network 200 is via the communication unit 111.

Processing by the data output determination unit 107 is described below in detail using FIG. 44. As steps S1101 and S1102 are the same as processing by the data output determination unit 107 shown in FIG. 26, their description is omitted.

The data output determination unit 107 of Embodiment 5 then determines whether or not correction based on history data should be performed (S1103). If it determines not to perform correction (N at S1103), it proceeds to step S1105.

On the other hand, if it determines that correction should be performed (Y at S1103), the data output determination unit 107 instructs the social information update unit 115 to attempt correction. The social information update unit 115 analyzes history data such as shown FIG. 43 and corrects closeness for each user according to the social information update thresholds shown in FIGS. 45A and 45B (S1104).

Specifically, FIG. 45A shows an example of thresholds for updating closeness in social information in several patterns, such as increasing closeness by +0.05 when devices as subjects of comparison analysis stayed in the same area for the total time of 50 hours or longer.

FIG. 45B further shows an example of thresholds for updating closeness depending on the time spent staying in the same area and value of a location (i.e., "place value") shown at ID "2" in FIG. 45A. For example, when a location referenced by position information, such as to as GPS, is an address registered for a school, devices that stay in that same area are likely to represent relationship as friends at school and closeness with a user related to the devices is corrected in accordance with the value of the location. Various kinds of location-related information are now available from network services over the Internet. Thus, estimation can be made based on general recognition of a location into which a device is carried, e.g., a theme park implies family or a boy/girlfriend or an expensive restaurant implies a very important person, and closeness can be updated so as to reflect actions in the real world.

Thus, the social information update unit 115 compares history data accumulated by the data accumulation unit 102 with updated history data for an external apparatus, and updates closeness included in social information using at least one of a relative distance indicated by position information for the data processing apparatus 100F and the external apparatus, area information, and a trend of increase/decrease in adjacency frequency. For example, when the data processing apparatus 100F and an external apparatus are positioned at locations at a short relative distance, the social information update unit 115 detects area information for those locations, and corrects closeness for the two apparatuses to values corresponding to the area information or increase their closeness if the frequency of the two apparatuses being adjacent to each other is on an increasing trend.

Returning to FIG. 44, as step S1105 and 1106 are the same as steps S705 and 706 shown in FIG. 26, their description is omitted.

The data output determination unit 107 of Embodiment 5 then determines whether devices were located within predefined ranges as data provision thresholds based on the priority level shown in FIG. 46 according to the relative distance between devices by analyzing history data of devices shown in FIG. 43 so as to determine, among send data candidates registered in an internal data list outputted by step S1106, a send data candidate that satisfies a predefined condition (S1107, see FIG. 47).

If it determines that the predefined condition is satisfied (Y at S1107), the data output determination unit 107 then adopts data for the corresponding time slot and location of shooting as the final send data (S1108). However, if it determines that the devices were outside the predefined relative distance ranges as data provision thresholds, that is, do not satisfy the predefined condition (N at S1107), the data output determination unit 107 does not adopt the data as the final send data (S1109).

The data output determination unit 107 then adds information to the internal data list according to the result of determination at step S1108 or step S1109 (S1110).

The data processing apparatus 100F shown in FIG. 39 accordingly executes a processing queue in accordance with the internal data list outputted by the data output determination unit 107 at step S108.

In this execution, "James" and "Paul" who are users determined to have a priority level of A or B based on their closeness shown in FIG. 34 and who own the two devices "DSC-Y" and "CM-P" for which history data was acquired and analyzed in this example as shown in FIG. 47 are selected as data provision candidates. Content data C-1 to C-4 that were recorded in time slots from 9:00 to 10:45 during which his relative distance satisfies the condition of "within 3 km" shown in FIG. 46 is sent to "James", and content data C-1 and C-2 that were recorded in time slots from 9:00 to 10:15 during which his relative distance satisfies the condition of "within 1 km" is sent to "Paul".

With this configuration, in addition to closeness between users represented by social information for relationship between a user associated with an object included in data of interest and a user as a candidate for provision, history data, such as position information, accumulated by a sensor in each device is retrieved via a network and the location or time slot in which devices were adjacent to each other is identified from history data calculated from the relative distance between the devices.

In addition, closeness included in social information is updated using at least one of a relative distance of position information for the data processing apparatus 100F and an external apparatus, area information, and a trend of increase/decrease in adjacency frequency, and whether data should be provided or not is determined using social information including closeness that reflects the latest state.

This enables identification of an acquaintance's device that was present nearby when the data of interest was generated during a travel, for example, allowing such control to send only pictures taken at a location or in a time slot and in which an acquaintance and the user were together to the acquaintance's device. This allows data corresponding to history of actual acts to be sent to close users without imposing an operational burden on the user selecting data that was generated at locations or in time slots in which they were together by himself.

Note that the social information update unit 115 may acquire status information indicating whether or not an external apparatus is able to receive content data via the communication unit 111 and update social information including the status information as described in FIG. 23(a). Here, status information refers to information on whether an external apparatus is powered on or off, information indicating whether or not the apparatus has a sufficient capacity for receiving content data, or information indicating that the apparatus is not able to receive content data due to execution of other processing, for example.

According this configuration, since whether data should be provided or not is determined using social information reflecting the latest status information that indicates whether an external apparatus can receive content data or not, content data can be sent to an external apparatus that is able to receive it and data sharing that reflects relationship between users more accurately can be facilitated.

In addition, the present description uses an example where the social information update unit 115 of the data processing apparatus 100F analyzes history data outputted by the sensor 116 to update social information. However, the application unit 104 may output contents of communication produced through communication with an application unit (not shown) of an external data processing apparatus as history data, and the social information update unit 115 may update social information by analyzing history data on the contents of communication with the external data processing apparatus, for example.

Specifically, the application unit 104 executes an application that provides functions for communication with the external apparatus via the communication unit 111. The data accumulation unit 102 then accumulates history of processing from execution of the application in the history data storage unit 114 as history data.

The social information update unit 115 then updates closeness included in social information using at least one of information on the other party of communication, the total communication count, a frequency of access, a trend of increase/decrease in access frequency, and a body of transmitted and received data which are included in history data stored in the history data storage unit 114. That is, the social information update unit 115 increases or decrease closeness in accordance with information on the other party of communication or contents of body of transmitted and received data, increases closeness when the total communication count or access frequency is high (e.g., increases closeness by 0.03 for every 100 communications as shown in FIG. 45A), or increases closeness when access frequency is on an increasing trend.

The data output determination unit 107 then determines whether to output content data or not using the latest social information updated by the social information update unit 115.

With this configuration, closeness included in social information is updated using at least one of information on the other party of communication, the total communication count, a frequency of access, a trend of increase/decrease in access frequency, and a body of transmitted and received data, and whether data should be provided or not is determined using social information including closeness that reflects the latest state. It therefore can facilitate data sharing that reflects relationship between users more accurately.

Figure 48:
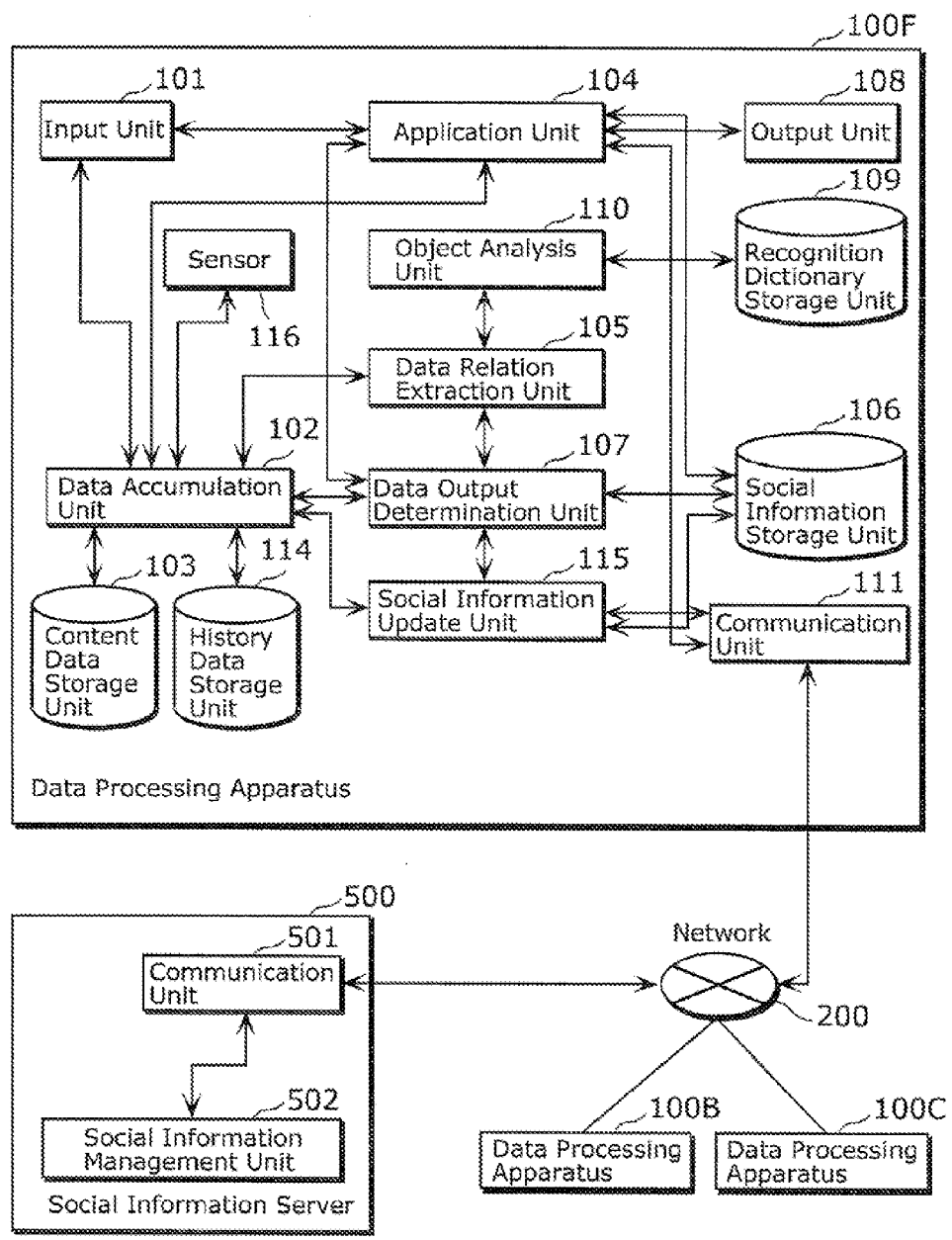
FIG. 48 is a block diagram showing another configuration of the data processing apparatus according to Embodiment 5 of the present invention.

FIG. 48 is a block diagram showing another configuration of the data processing apparatus 100F according to Embodiment 5 of the invention.

Embodiment 5 described above showed a case where the social information update unit 115 of the data processing apparatus 100F updates social information by analyzing information that can be internally acquired in the data processing apparatus 100F and information acquired from outside. However, the social information update unit 115 may update social information with such a configuration as shown in FIG. 48, for example.

That is, the data processing apparatus 100F is connected with a social information server 500 via the network 200. The social information update unit 115 acquires the latest social information from the social information server 500, which is an external apparatus, via the communication unit 111, and updates social information.

To be specific, the social information update unit 115 sends a request for acquiring social information to a social information management unit 502 via the communication unit 111 of the data processing apparatus 100F and a communication unit 501 of the social information server 500. The social information update unit 115 then acquires the latest social information as a reply to the social information acquisition request and stores the latest social information acquired in the social information storage unit 106.

The data output determination unit 107 then uses the latest social information updated by the social information update unit 115 to determine whether to output content data or not.

With this configuration, since whether data should be provided or not is determined using social information including closeness that reflects the latest state, data sharing that reflects relationship between users more accurately can be facilitated.

Furthermore, processing burden involved with an analysis process required for update of closeness on a data processing apparatus can be reduced.

When the social information update unit 115 has updated social information stored in the social information storage unit 106 based on information acquired inside the data processing apparatus 100F, the social information update unit 115 may send all or some of the social information to the social information management unit 502 of the external social information server 500 as a social information update as request.

Embodiment 6

Figure 49:
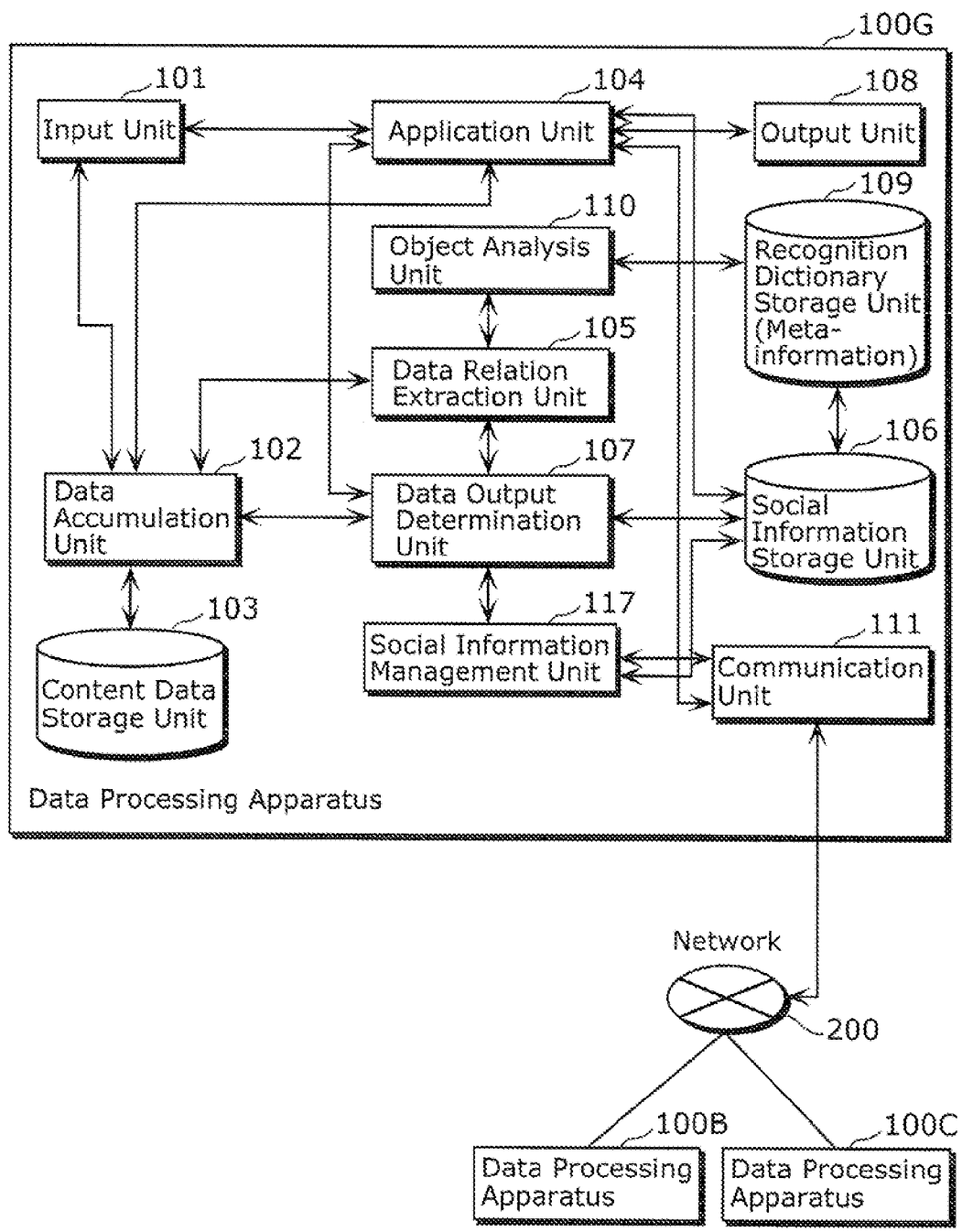
FIG. 49 is a block diagram showing a configuration of a data processing apparatus according to Embodiment 6 of the present invention.

FIG. 49 is a block diagram showing a configuration of a data processing apparatus 100G according to Embodiment 6 of the invention. In FIG. 49, the same reference numerals are used for the same components as in FIGS. 1 and 11, and their descriptions are omitted.

In FIG. 49, the data processing apparatus 100G has a social to information management unit 117 in addition to the components of FIG. 11, and the recognition dictionary stored in the recognition dictionary storage unit 109 stores meta-information therein (the configuration of Embodiment 6).

The data processing apparatus 100G of Embodiment 6 is a video recorder or home server into which an external storage medium with image data stored therein can be inserted and which can accumulate plural pieces of image data that have been read in, a digital still or video camera that is capable of taking and accumulating plural still or moving images, a digital photo frame capable of accumulating and displaying still and/or moving images, or the like, for example.

Upon accepting a data acquisition and update request from an external apparatus via the communication unit 111, the social information management unit 117 shown in FIG. 49 acquires data for the recognition dictionary used by the object analysis unit 110 from the external apparatus and updates the recognition dictionary according to closeness.

To be specific, the social information management unit 117 performs update, editing, saving, and supply to an external entity of social information stored in the social information storage unit 106 or the recognition dictionary (including meta-information) stored in the recognition dictionary storage unit 109 in response to a request from the external data processing apparatus 1006 or the data processing apparatus 100C connected via the communication unit 111 and the network 200.

The object analysis unit 110 extracts objects included in content data using the recognition dictionary updated by the social information management unit 117.

When two or more pieces of meta-information corresponding to to one object that can be extracted by the object analysis unit 110 using the recognition dictionary are associated with social information, the data output determination unit 107 determines to preferentially output one of the two pieces of meta-information that is associated with a higher closeness included in social information.

The application unit 104 has a function as a data output unit for outputting content data and meta-information which the data output determination unit 107 has determined to be preferentially outputted.

Data processing for the user "Alice" who owns the external data processing apparatus 100B to edit meta-information in the recognition dictionary of the data processing apparatus 100G is described next.

Figure 50:
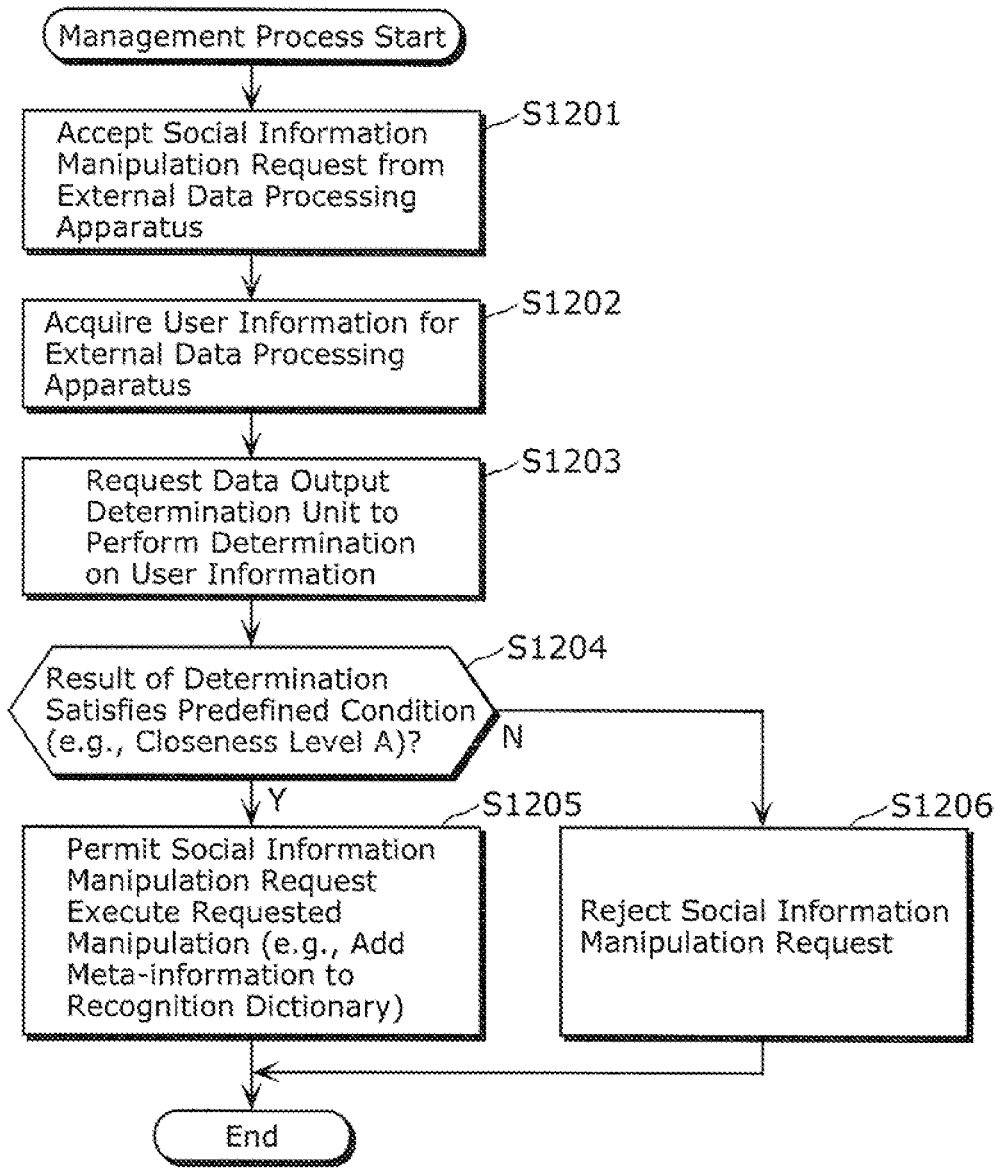
FIG. 50 is a flowchart showing a flow of a social information management process according to Embodiment 6 of the present invention.

FIG. 50 is a flowchart showing a flow of a social information management process in Embodiment 6 of the invention.

FIG. 51 is a diagram showing an example of user information in Embodiment 6 of the invention.

Figure 52:
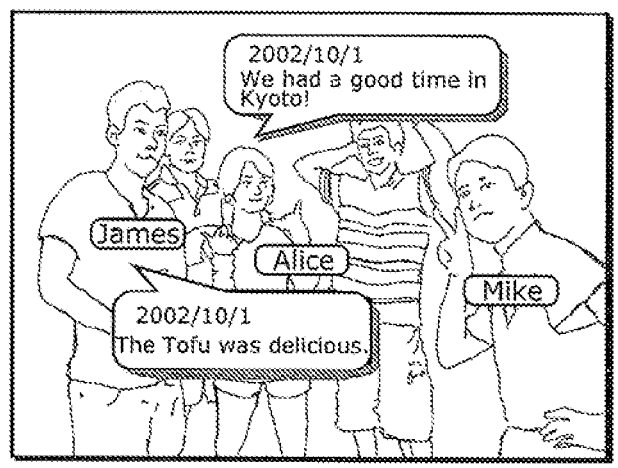
FIG. 52 is an illustration showing an example of a screen output result according to Embodiment 6 of the present invention.

FIG. 52 is an illustration showing an example of a screen output result in Embodiment 6 of the invention.

It is assumed here that social information stored by the social as information storage unit 106 of the data processing apparatus 100G is the same as in FIG. 20, target image data is the same as in FIG. 16, and the result of object analysis by the object analysis unit 110 is the same as in FIG. 17.

As shown in FIG. 50, the social information management unit 117 of the data processing apparatus 100G according to Embodiment 6 first accepts a social information manipulation request from an external device (here, the data processing apparatus 100B owned by user Alice) via the communication unit 111 and the network 200 (S1201).

The social information management unit 117 next acquires user information (see FIG. 51) for the user who owns the sending device that sent the social information manipulation request either directly from social information manipulation request message data or separately from the data processing apparatus 100B (S1202).

The social information management unit 117 further passes the user information for the user it acquired to the data output determination unit 107 and requests the unit 107 to determine whether data should be provided or not to the data processing apparatus 100B (S1203).

The social information management unit 117 then determines whether or not a predefined condition, e.g., priority level being A, is satisfied in the result of determination returned from the data output determination unit 107 (S1204).

If it determines that the predefined condition is satisfied (Y at S1204), the social information management unit 117 accepts the social information manipulation request and executes a manipulation request, such as editing meta-information in the recognition dictionary via the social information storage unit 106 (S1205).

The present description shows a case where the user with number "3" assigned in FIG. 16 has been determined to be "unknown" and not recognized as "Alice" in the result of object analysis for content data C-3 in FIG. 17. In this case, the user "Alice" herself edits meta-information related to the recognition dictionary of the data processing apparatus 100G owned by the user "Mike" through a social information manipulation request. That is, the user "Alice" can add that the object ID "3" of the data represents "Alice" and also a comment relating to object ID "3", "We had a good time in Kyoto!"

At the time of editing meta-information, user information for the user is recorded in the recognition dictionary together. This enables reverse lookup of the user who edited the meta-information, enabling control that reflects closeness between the user who edited the display priority for the meta-information and the user operating the application unit 104 when the application unit 104 displays a screen via the output unit 108.

That is, when there are two or more pieces of meta-information for one object, the data output determination unit 107 determines to preferentially output the meta-information associated with a higher closeness.

On the other hand, if the result of determination returned does not satisfy the predefined condition (N at S1204), the social information management unit 117 rejects the social information manipulation request (S1206) and ends processing.

For example, when the data processing apparatus 100G of Embodiment 6 is a digital photo frame, the application unit 104 displays data C-3 on the screen and also meta-information, such as the name of similar persons analyzed by the object analysis unit 110 and comments, as shown in FIG. 52. In this case, control can be exerted such that only meta-information that was directly edited by users having priority level A or B and users having priority level A shown in FIG. 17(b) is displayed, enabling preferential display of a reasonable amount of information in which the users are highly interested.

Note that the comment, "The Tofu was delicious", displayed as meta-information on the user "James" as may be contents edited by the user "James" previously as a comment on the data, or a diary or post written on the date of shooting from the URL of a blog indicated in user information for the user James may be retrieved from an external server (not shown) on the network 200 via the communication unit 111 and displayed.

In addition, by thus retrieving and displaying the latest diary or post, in addition to the diary or post on the day on which the image was taken, for the image for data as a display candidate, the latest interests or activities of a close user can be visually seen on the screen of the digital photo frame.

Note that although the present description uses an example where meta-information related to the recognition dictionary of the data processing apparatus 100G is edited in response to the social information manipulation request from the external data processing apparatus 100B, what is requested as a social information manipulation is not limited thereto. Learning operations for object analysis with the recognition dictionary may be performed from the external data processing apparatus 100B, or the recognition dictionary maintained on the data processing apparatus 100G may be referenced, acquired, or utilized by the data processing apparatus 100B.

With this configuration, data of the recognition dictionary is acquired from an external apparatus and the recognition dictionary is updated according to closeness, and objects included in content data are extracted using the latest recognition dictionary. That is, in updating, editing, saving, and supply to an external entity of the recognition dictionary used for analysis of objects included in data and meta-information associated with the recognition dictionary, the relationship between the user who is the information owner of the recognition dictionary and meta-information and the user who requests processing is determined using the closeness between the users represented in social information. This can enable control to permit editing of the recognition dictionary only when closeness exceeding a predetermined threshold is established for a user who wants to edit the recognition dictionary, for example, and permit editing only by a close user while avoiding malicious editing by an unauthorized user.

In addition, because a recognition dictionary built by close users together can be shared, it is possible to reduce an operational burden on the user involved with learning of a recognition dictionary by the user compared with when learning of a recognition dictionary is done on a per-device basis.

In addition, when plural pieces of meta-information are given for one object included in data of interest through editing by plural users, control can be exerted such that meta-information given by a user having a higher closeness is preferentially displayed. Accordingly, meta-information that is more reliable and users are interested in can be selected from plural pieces of meta-information.

The data processing apparatuses according to the embodiments of the invention have been described above, but the invention is not limited to these embodiments.

That is, the embodiments disclosed herein should be construed as illustrative and not limitative in all respects. The scope of the invention is defined by Claims rather than the foregoing description, and is intended to include all modifications falling within the sense and scope equivalent to Claims.

For example, although Embodiments 1 to 6 are described using owned-device ID which relates a user to a device as means for determination on whether a user satisfies a certain condition, means for user determination is not limited thereto. An e-mail address, the URL of a blog or diary on an SNS, keywords, login information for an SNS site or data processing apparatus, and binary data including images that can identify the user may be used.

Figure 53:
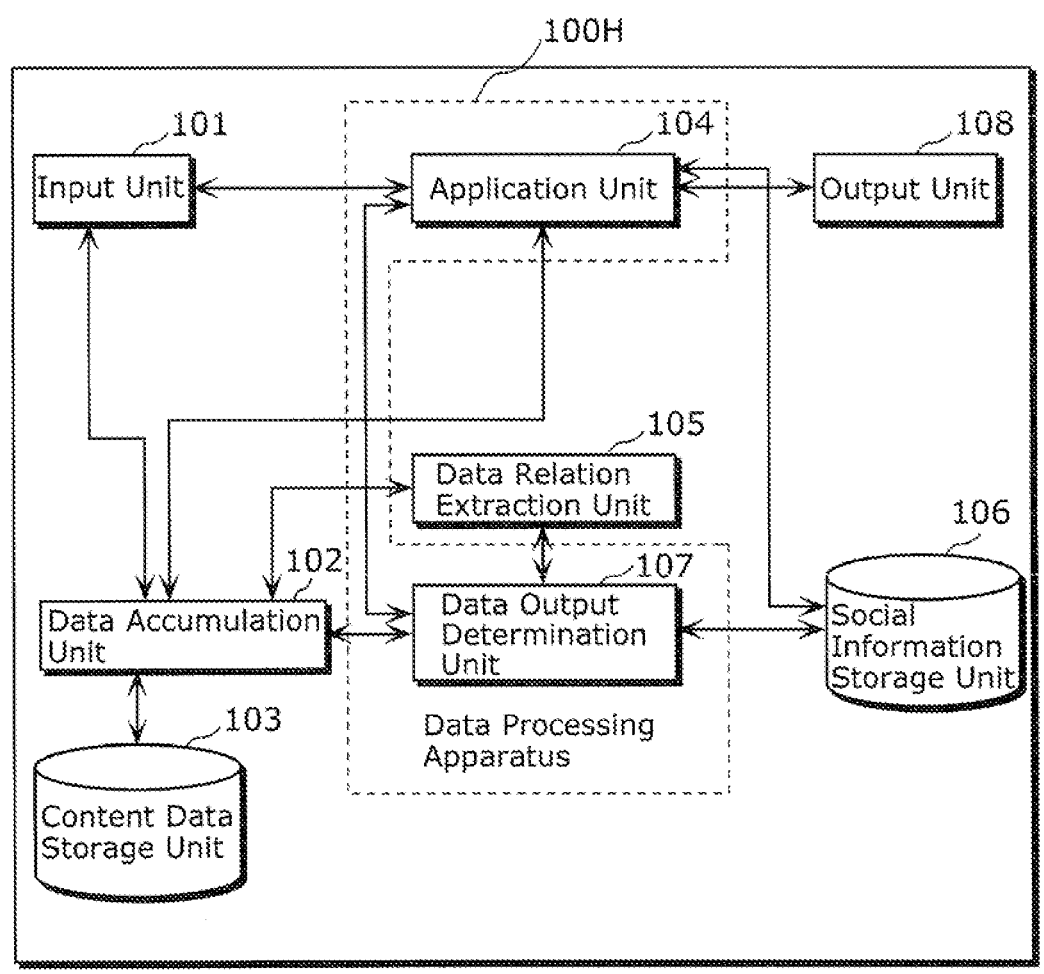
FIG. 53 is a block diagram showing a minimum configuration of the data processing apparatus according to embodiments of the present invention.

In addition, although the data processing apparatuses of Embodiments 1 to 6 include such processing units shown in FIG. 1, a data processing apparatus 100H is only required to include the application unit 104 and the data output determination unit 107 at the minimum as shown in FIG. 53. FIG. 53 is a block diagram showing a minimum configuration of the data processing apparatus in embodiments of the invention. In this case, the data output determination unit 107 determines that content data should be outputted when closeness is equal to or greater than a predetermined threshold, and the application unit 104 outputs content data in accordance with the result of determination by the data output determination unit 107. Since this configuration saves the user from an operational burden such as the user himself choosing desired target data from a large amount of target data, data sharing with family members and/or acquaintances with reduced operational burden on the user can be realized.

It should be noted that the present invention can be implemented, in addition to implementation as a data processing apparatus described above, as a data processing method including, as its steps, the characteristic processing units included in the data processing apparatus.

Furthermore, the present invention can be implemented as a program which, when loaded into a computer, allows a computer to execute the steps included in the data processing method. It should be understood that such a program can be distributed via recording as medium such as a CD-ROM and transmission medium such as the Internet.

Furthermore, the functional blocks included in the data processing apparatus may be implemented as an LSI which is an integrated circuit. These blocks can be integrated separately, or a part or all of them can be integrated into a single chip The LSI here can be referred to as an IC, a system LSI, a super LSI, or an ultra LSI, depending on the degree of integration. An integrated circuit used for such an embodiment is not limited to an LSI, and it may be embodied as a dedicated circuit or a general-purpose processor. It is also possible to use a field programmable gate array (FPGA) which can be programmed in the field after manufacturing an LSI, or a reconfigurable processor in which connection and setting of circuit cells inside an LSI can be reconfigured.

Furthermore, when a technology for the integrated circuit replacing LSI is developed with the advance of semiconductor technology or relevant technology, functional blocks can be integrated using the technology. Possible field of technology to be applicable includes, for example, bio technology and organic chemistry technology and others.

INDUSTRIAL APPLICABILITY

The data processing apparatus according to the invention is advantageous for application to a video recorder, home server, digital still camera, digital video camera, personal computer, enterprise computer (work station), digital television receiver with image data loading functions, set top box, car navigation system, projector, mobile terminal, music component, digital photo frame, remote control terminal for device control, and the like.

REFERENCE SIGNS LIST 100, 100A, 100B, 100C, 100D, 100E, 100F, 100G, 100H data as processing apparatus
101 input unit
102 data accumulation unit
103 content data storage unit
104 application unit
105 data relation extraction unit
106 social information storage unit
107 data output determination unit
108 output unit
109 recognition dictionary storage unit
110 object analysis unit
111, 501 communication unit
112 data conversion unit
113 adjacency history management unit
114 history data storage unit
115 social information update unit
116 sensor
117, 502 social information management unit
200 network
500 social information server

The invention claimed is:

1. A data processing apparatus which outputs content data, said apparatus comprising:
   a microprocessor; and
   a non-transitory memory having stored thereon executable instructions, which when executed by said microprocessor, cause said data processing apparatus to function as:
      a data output determination unit configured to determine whether or not to output the content data using social information including (i) closeness indicating a degree of familiarity between certain users and (ii) information for associating the content data with the closeness;
      a data output unit configured to output the content data when said data output determination unit determines to output the content data;
      a recognition dictionary storage unit configured to store a recognition dictionary for recognizing a person included in the content data; and
      an object analysis unit configured to extract the person included in the content data using the recognition dictionary,
   wherein said data output determination unit is configured to refer to the social information and determine to output, to an external apparatus that corresponds to a user that has the closeness with the person included in the content data, the closeness being equal to or greater than a predetermined threshold among users associated by the social information, and the content data being associated with the closeness.

2. The data processing apparatus according to claim 1, wherein the executable instructions further cause said data processing apparatus to function as a data relation extraction unit configured to extract information indicating a relationship between pieces of content data, and
   wherein said data output determination unit is further configured to determine to output content data that has a predetermined relationship indicated by information extracted by said data relation extraction unit.

3. The data processing apparatus according to claim 1, wherein the executable instructions further cause said data processing apparatus to function as a communication unit configured to perform communication with the external apparatus via a communication network, and
   wherein said data output unit is configured to output the content data to the external apparatus via said communication unit.

4. The data processing apparatus according to claim 3, wherein the executable instructions further cause said data processing apparatus to function as an adjacency history management unit configured to acquire, as adjacency history information, a history of short range communication with the external apparatus performed via said communication unit, and
   wherein said data output determination unit is further configured to determine to output the content data to an external apparatus that performed short range communication indicated in the adjacency history information and that corresponds to a user having the closeness equal to or greater than the predetermined threshold among users associated by the social information.

5. The data processing apparatus according to claim 3, wherein the executable instructions further cause said data processing apparatus to function as a social information update unit configured to acquire status information indicating whether or not the external apparatus is able to receive the content data via said communication unit, and update the social information including the status information, and
   wherein said data output determination unit is further configured to determine whether or not to output the content data using the status information included in the social information updated most recently by said social information update unit.

6. The data processing apparatus according to claim 3, wherein the executable instructions further cause said data processing apparatus to function as a social information update unit configured to acquire a latest social information from the external apparatus via said communication unit and update the social information, and
   wherein said data output determination unit is further configured to determine whether or not to output the content data using the social information updated most recently by said social information update unit.

7. The data processing apparatus according to claim 3, wherein the executable instructions further cause said data processing apparatus to function as:
      an application unit configured to execute an application which provides functions for communication with the external apparatus via said communication unit;
      a data accumulation unit configured to accumulate a history of processing from execution of the application as history data; and
      a social information update unit configured to update the closeness included in the social information using at least one of information on a partner of communication, a total communication count, a frequency of access, a trend of increase/decrease in access frequency, and a body of transmitted and received data which are included in the history data, and
   wherein said data output determination unit is further configured to determine whether or not to output the content data using the social information updated most recently by said social information update unit.

8. The data processing apparatus according to claim 3,
wherein the executable instructions further cause said data processing apparatus to function as:
- a sensor configured to detect information on surroundings which indicates a position of said data processing apparatus;
- a data accumulation unit configured to accumulate history data for results of detection by said sensor; and
- a social information update unit configured to acquire history data of the information on surroundings for the external apparatus via said communication unit and update the social information of the external apparatus with social information including the history data acquired, wherein said social information update unit is configured to compare history data accumulated by said data accumulation unit to updated history data of the external apparatus, update closeness included in the social information using at least one of a relative distance of position information of said data processing apparatus and the external apparatus, area information, and a trend of increase/decrease in adjacency frequency, and wherein said data output determination unit is further configured to determine whether or not to output the content data using the social information updated most recently by said social information update unit.

9. The data processing apparatus according to claim 3,
wherein the executable instructions further cause said data processing apparatus to function as a social information management unit configured to, when a data acquisition and update request from the external apparatus is accepted via said communication unit, acquire data of the recognition dictionary used by said object analysis unit from the external apparatus and update the recognition dictionary, in accordance with the closeness, and
wherein said object analysis unit is configured to extract the person included in the content data using the recognition dictionary updated by said social information management unit.

10. The data processing apparatus according to claim 9,
wherein when two or more pieces of meta-information corresponding to one person that can be extracted by said object analysis unit using the recognition dictionary are associated with the social information,
- said data output determination unit is further configured to determine to preferentially output meta-information associated with a higher closeness included in the social information, out of the two or more pieces of meta-information, and
- said data output unit is configured to output the content data and the meta-information which has been determined to be preferentially outputted.

11. The data processing apparatus according to claim 1,
wherein the executable instructions further cause said data processing apparatus to function as a data conversion unit configured to convert the content data into an arbitrary format,
wherein said data output determination unit is further configured to cause said data conversion unit to convert the content data in accordance with the closeness and determine to output the content data, and
wherein said data output unit is configured to output the content data converted by said data conversion unit in accordance with a result of determination by said data output determination unit.

12. A data processing method for outputting content data, said data processing method comprising:
- determining whether or not to output the content data using social information including (i) closeness indicating a degree of familiarity between certain users and (ii) information for associating the content data with the closeness;
- outputting the content data when it is determined, in said determining, that the content data is to be determined; and
- extracting a person included in the content data using a recognition dictionary for recognizing the person included in the content data stored in a recognition dictionary storage unit, wherein, in said determining, the social information is referred to and the content data associated with the closeness is determined to be outputted to a user that has the closeness with the person included in the content data, the closeness being equal to or greater than a predetermined threshold among users associated by the social information.

13. A program recorded on a non-transitory computer-readable recording medium, said program causing a computer to execute the data processing method according to claim 12.

14. An integrated circuit which outputs content data, said integrated circuit comprising:
- a microprocessor; and
- a non-transitory memory having stored thereon executable instructions, which when executed by said microprocessor, cause said integrated circuit to function as:
  - a data output determination unit configured to determine whether or not to output the content data using social information including (i) closeness indicating a degree of familiarity between certain users and (ii) information for associating the content data with the closeness;
  - a data output unit configured to output the content data when said data output determination unit determines to output the content data; and
  - an object analysis unit configured to extract a person included in the content data using a recognition dictionary for recognizing the person included in the content data stored in a recognition dictionary storage unit, wherein said data output determination unit is configured to refer to the social information and determine to output, to an external apparatus that corresponds to a user that has the closeness with the person included in the content data, the closeness being equal to or greater than a predetermined threshold among users associated by the social information, and the content data being associated with the closeness.

* * * * *